United States Patent
Benisty

(10) Patent No.: US 10,387,078 B1
(45) Date of Patent: Aug. 20, 2019

(54) ADAPTIVE CONTROL OF HOST QUEUE DEPTH FOR COMMAND SUBMISSION THROTTLING USING DATA STORAGE CONTROLLER

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 30 days.

(21) Appl. No.: 15/920,056

(22) Filed: Mar. 13, 2018

(51) Int. Cl.
| G06F 12/00 | (2006.01) |
| G06F 13/00 | (2006.01) |
| G06F 13/28 | (2006.01) |
| G06F 3/06 | (2006.01) |
| G06F 13/16 | (2006.01) |
| G06F 9/48 | (2006.01) |

(52) U.S. Cl.
CPC .......... G06F 3/0659 (2013.01); G06F 3/0611 (2013.01); G06F 3/0679 (2013.01); G06F 13/1689 (2013.01); G06F 9/4881 (2013.01); G06F 2213/0026 (2013.01)

(58) Field of Classification Search
CPC .............................. G06F 3/0659; G06F 9/4881
USPC ......................................................... 711/103
See application file for complete search history.

(56) References Cited

U.S. PATENT DOCUMENTS

| 7,739,470 | B1* | 6/2010 | Norgren | G06F 11/3485 709/224 |
| 2004/0193397 | A1* | 9/2004 | Lumb | G06F 13/105 703/24 |
| 2004/0252672 | A1* | 12/2004 | Nemazie | G06F 13/4022 370/351 |
| 2011/0246677 | A1* | 10/2011 | Johnson | G06F 3/0613 710/10 |
| 2015/0347031 | A1* | 12/2015 | Dallas | G06F 3/061 711/154 |
| 2017/0123656 | A1 | 5/2017 | Benisty et al. | |

OTHER PUBLICATIONS

"NVM Express" Revision 1.3a; Oct. 24, 2017; 287 pages.

* cited by examiner

*Primary Examiner* — Edward J Dudek, Jr.
*Assistant Examiner* — Sidney Li
(74) *Attorney, Agent, or Firm* — Loza & Loza, LLP; Gabriel Fitch

(57) ABSTRACT

The present disclosure describes technologies and techniques for use by a data storage controller (such as a non-volatile memory (NVM) controller) to adaptively throttle the issuance of commands by a host to the controller. In illustrative examples, an NVM controller throttles the insertion of commands by the host into its submission queues to prevent timeouts that might otherwise occur if the NVM controller has slowed its operations (due, for example, to excessive temperatures within the NVM controller) and is thus unable to complete all issued commands within a host timeout interval. In some examples, throttling is achieved by providing the host with an adjusted head pointer set to a value to reduce the depth of the submission queue as observed by the host. Fewer commands are then sent by the host to the NVM controller via the submission queues, reducing the risk of a host timeout. NVMe examples are provided.

30 Claims, 16 Drawing Sheets

ADAPTIVE CONTROL OF HOST QUEUE DEPTH FOR COMMAND SUBMISSION THROTTLING USING DATA STORAGE CONTROLLER

FIELD

The subject matter described herein relates to data storage devices and controllers. More particularly, the subject matter relates, in some examples, to the control of submission queues using a data storage controller within a non-volatile memory express (NVMe) system.

INTRODUCTION

The non-volatile memory express (NVMe) system is a scalable host controller interface designed to address the needs of enterprise and client systems that utilize Peripheral Component Interconnect (PCI) Express-based solid state drives. See, for example, the NVM Express standard, Revision 1.3a, Oct. 24, 2017. With NVMe, a host device writes data storage device commands, such as read commands, write commands, and administrative commands, into submission queues that are implemented in host memory. The controller of a NVM storage device (such as a NAND controller) fetches the commands from the host submission queues, executes the commands, and posts entries in completion queues, which are also implemented in host memory, to thereby notify the host device of the completion of the commands. As such, completions may be generated by the NVM data storage controller upon determining that the data transfer for a specific command has been completed. For instance, for a 16 kilobyte (KB) read command, the NVM data storage controller may transfer NAND read data to the host, and once the NVM data storage controller detects that the entire transfer has completed, a completion message is generated by the NVM data storage controller and posted to the host via a completion entry placed in the completion queue. Completion entries may also include error messages to indicate if a command was unsuccessful.

In this manner, NVMe exploits a paired submission and completion queue mechanism where commands are initially placed by host software into a submission queue and then the completions (or error messages) are placed by the NVM data storage controller into the associated completion queue. The submission and completion queues may be, for example, circular buffers. The circular buffers each include head and tail pointers that mark the ends of the current entries of the queue and define the current queue depth. Herein, the maximum queue depth refers to the maximum number of entries a particular queue can support (set during initialization). The current queue depth refers to the current remaining space available within the queue, i.e. the maximum queue depth minus the current number of entries in the queue.

During usage of an NVM device by a host device such as a videocamera, circumstances can arise within the NVM data storage controller that trigger timeouts or other exception conditions in the host device that degrade overall system performance. For example, if the NVM data storage controller cannot keep up with memory access requests from the host device, the host device might trigger an exception that forces the NVM data storage controller to re-start or, in some cases, the host device might determine that the NVM data storage controller is malfunctioning or is not compatible with the host device, and then disable any further usage of the NVM device, greatly frustrating the consumer. Often, however, the issues preventing the NVM data storage controller from keeping up with requests by the host device are only temporary and may be due, e.g., to high temperatures that temporarily force the NVM data storage controller to slow its operations to prevent overheating (or to prevent exceeding an allocated power consumption level). As such, some actions taken by the host device, such as disabling all further usage of the NVM device, would be inappropriate and unnecessary.

It would be desirable to provide solutions to these and other issues that can be implemented within NVM data storage controllers (and other similar devices).

SUMMARY

One embodiment of the present disclosure provides a method for use by a data storage controller for controlling a data storage device based on commands issued by a host device, the method including: determining a current queue depth for a queue used by the host device to issue commands to the data storage controller, where the host device is configured to control the issuance of the commands based on queue depth; determining a modified queue depth for reporting to the host device that is different from the current queue depth; and controlling the issuance of additional commands from the host device to the data storage controller by reporting the modified queue depth to the host device rather than the current queue depth.

Another embodiment of the present disclosure provides a data storage controller, where the data storage controller includes a processing system configured to: determine a current queue depth for a queue used by the host device to issue commands to the data storage controller, where the host device is configured to control the issuance of the commands based on queue depth; determine a modified queue depth for reporting to the host device that is different from the current queue depth; and control the issuance of additional commands from the host device to the data storage controller by reporting the modified queue depth to the host device rather than the current queue depth.

Yet another embodiment of the present disclosure provides an apparatus for use with a data storage controller, comprising: means for determining a current queue depth for a queue used by a host device to issue commands to the data storage controller, where the host device is configured to control the issuance of the commands based on queue depth; means for determining a modified queue depth for reporting to the host device that is different from the current queue depth; and means for controlling the issuance of additional commands from the host device to the data storage controller by reporting the modified queue depth to the host device rather than the current queue depth.

BRIEF DESCRIPTION OF THE DRAWINGS

The subject matter described herein will now be explained with reference to the accompanying drawings of which.

DETAILED DESCRIPTION

Figure 1:
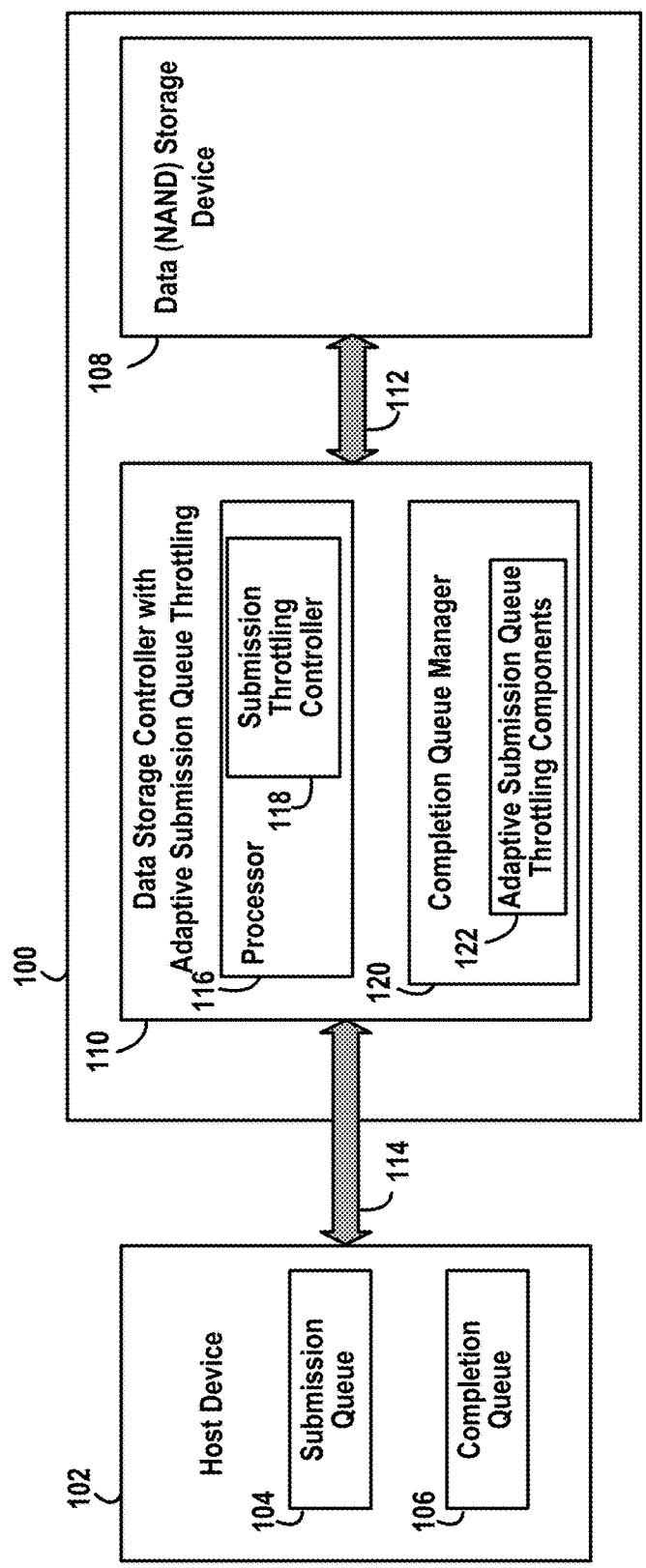
FIG. 1 illustrates a data storage system having a data storage controller and a data storage device (such as a NAND), where the data storage controller is equipped to adaptively throttle the insertion of memory access commands by a host device into its submission queues.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for throttling the insertion of commands by a host device into submission queues. Examples herein relate to non-volatile memory (NVM) storage systems configured for use with the NVM Express (NVMe) system, wherein an NVM data storage controller (i.e. a device controller) is configured to control access to an NVM such as a NAND using NVMe protocols. See, again, the NVM Express standard, Revision 1.3a, Oct. 24, 2017. However, aspects of the techniques described herein are applicable to other data storage systems or protocols.

As noted in the Background Section above, circumstances can arise with an NVMe system that cause timeouts or other exception conditions in a host device. For example, if the NVM data storage controller temporarily reduces its processing speed due to high temperatures, the NVM data storage controller might not be capable of keeping up with a high volume of memory access requests or commands from the host device. This, in turn, may trigger a timeout condition, causing the host device to take action that is unwarranted, such as forcing the NVM data storage controller to re-start or, in some cases, disabling any further usage of the NVM data storage controller based on the mistaken conclusion that the NVM data storage controller is malfunctioning or is otherwise not compatible with the host device.

One possible solution might be to completely disable NVMe fetching for some period of time, i.e., the NVM data storage controller would stop fetching new memory access commands from the host submission queue, which in turn would eventually cause the host to stop adding new commands to the submission queue (since the queue would become full). Another possible solution would be to perform "completion throttling" wherein the NVM data storage controller throttles the host while delaying the posting of completions to already executed host commands That is, although the NVM data storage controller has already completed various memory access commands, the controller would not promptly notify the host of the completion, thus causing the host to slow down or suspend the submission of new requests and, as a result, yielding a reduction in power consumed by the NVM data storage controller (and hence ultimately reducing device temperatures). However, a possible drawback of these approaches is that the timeouts might still be triggered. For example, NVMe employs a submission queue "doorbell" and, whenever the submission queue doorbell is set, the host device activates a timer. The NVM data storage controller must typically respond to the relevant memory access command in, e.g., about ten seconds. Otherwise, the host device will "timeout" the command In both of the aforementioned approaches, the NVM data storage controller might not execute all commands on time, triggering the timeout.

Herein, solutions are provided to avoid or mitigate such timeout problems and other issues. In several examples described herein, an NVM data storage controller adaptively and dynamically throttles the rate by which a host device inserts commands into NVMe submission queues to prevent timeouts or exception conditions. As will be explained, adaptive throttling may be achieved by providing the host with a head pointer for a submission queue that differs from the actual head pointer maintained within the NVM data storage controller, with the adjusted head pointer set by the NVM data storage controller to throttle submissions by the host to the NVM device. That is, the NVM data storage controller reports (or otherwise exposes) a different head pointer to the host than the one tracked by the NVM data storage controller. For instance, even if a submission queue has a relatively large amount of depth available for additional entries, the NVM data storage controller reports a head pointer (via a completion queue entry posted in a separate completion queue) that indicates there is relatively little submission queue depth currently available. The host device, in accordance with its normal processing, then stops sending (or reduces the rate of) new memory access requests to the NVM controller via the submission queues, thus allowing the NVM data storage controller more time to complete its current memory access requests before a timeout occurs.

Hence, in at least some examples described herein, the NVM data storage controller operates to change the current queue depth that is observed by the host. For instance, even if a submission queue is only half full, the NVM data storage controller may report a head pointer to the host that indicates the submission queue is already three-quarters full. Herein, the queue depth reported to (or exposed to) the host may be referred to as the "effective queue depth," but it may also be referred to as the modified, adjusted, observed or target queue depth. In the examples described herein, to achieve throttling, the effective queue depth is set to a value less than the actual current queue depth. As will be explained, the NVM data storage controller may determine the appropriate effective queue depth to achieve a target amount of throttling based on the current queue depth, the maximum queue depth, and various other parameters. (As noted above, the maximum queue depth refers to the maximum number of entries a particular queue can support. The current queue depth refers to the current space actually available within the queue, i.e. the maximum queue depth minus the current number of entries in the queue.)

These features will be summarized with reference to the first two figures.

Exemplary Data Storage Controller Embodiments

FIG. 1 illustrates, at a high level, a data storage system 100 configured to selectively throttle the posting of submission entries by a host device 102, where the host is equipped with a submission queue 104 and a completion queue 106. For a write operation, the data storage system 100 receives data from the host device 102 (via the submission queue 104) and stores the data in a data storage device 108, such as a NAND, under the control of a data storage controller 110 (which may also referred to as a memory controller). Data and commands may be routed between the data storage controller 110 and the data storage device 108 along an internal bus 112. Data and commands may be routed between the host device 102 and the data storage controller 110 along an external bus 114.

The data storage device 108 supplies information to the data storage controller 110 indicating successful completion of the storage of the data or indicating error or anomaly conditions. The data storage controller 110 then generates completion entries to indicate successful completion of a particular data transfer command or to indicate errors or anomalies That is, completion entries are generated by data storage controller 110 upon determining that a specific command has been completed. By way of example, for a particular write command, the data storage device 108 stores the write data and, when the device controller 110 detects that the storage has been successfully completed, a corresponding completion entry is generated by the device controller 110 and posted to the host via the completion queue 106.

In the implementation example of FIG. 1, data storage controller 110 includes a processor 116 with a submission throttling controller 118 that activates or deactivates throttling and otherwise controls the throttling operations. The data storage controller 110 also includes a completion queue manager 120 that manages the posting of the completion entries to the completion queue 106 of the host device, while also selectively throttling the insertion of new commands into the submission queue 104 by the host device 102. In this particular example, the completion queue manager 120 incudes adaptive submission queue throttling components 122 that throttle the host by, e.g., reporting or exposing a different head pointer to the host than the actual head pointer maintained by the data storage controller 110. That is, completion queue manager 120, under the control of the submission throttling controller 118 of the processor 116, intelligently and adaptively throttles the insertion of commands into the submission queue 104 by the host device 102 to avoid timeout conditions or other exceptions that might occur within the host, particularly if the data storage controller 110 reduces its processing speed due to excessive temperatures and/or to reduce power consumption.

Note that FIG. 1 illustrates only selected features of an exemplary system. A more complete system configured in accordance with NVMe is described below. Moreover, the discussion of FIG. 1 has used the storage of data to the data storage device 108 (i.e. a write operation) as an illustrative example. The system is also equipped to retrieve data (i.e. perform read operations) from the data storage device 108 and to perform other related functions. A wide variety of completion entries may thus be generated and processed by the system.

Figure 2:
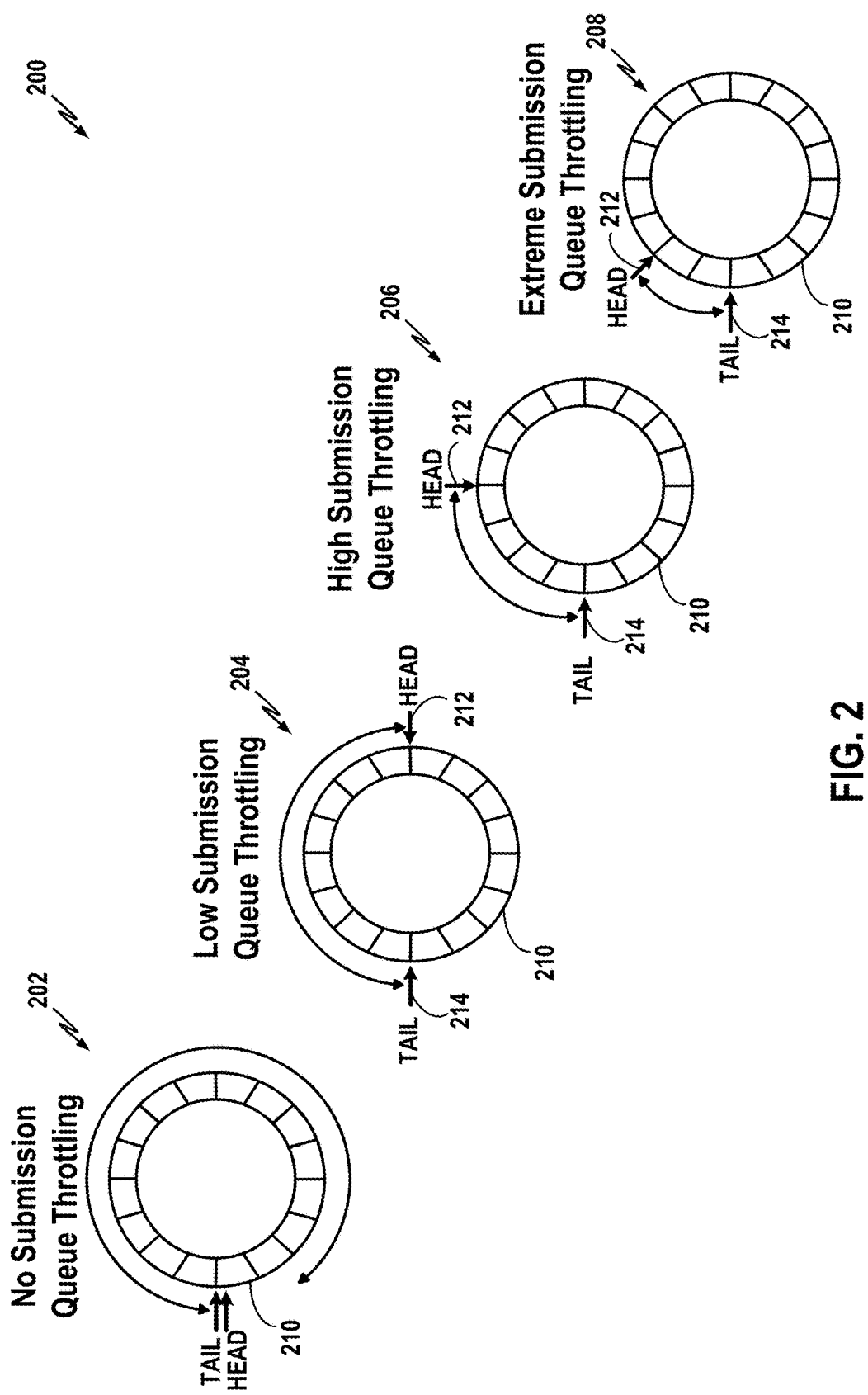
FIG. 2 illustrates exemplary throttling scenarios where the submission queue is a circular queue and throttling is achieved by changing the head pointer of the queue that is exposed by the data storage controller to the host device.

FIG. 2 illustrates exemplary submission queue throttling of a host via four throttling examples or scenarios 200: a No Submission Queue Throttling scenario 202, a Low Submission Queue Throttling scenario 204, a High Submission Queue Throttling scenario 206, and an Extreme Submission Queue Throttling scenario 208. In each case, the submission queue is a circular submission queue 210. In each of the examples of FIG. 2, the submission queue 210 is empty (i.e. all commands have already been completed). A head pointer 212 and a tail pointer 214 are associated with the queue 210 and are reported (or otherwise exposed) to the host. In each case, the data storage controller maintains the actual (correct) head and tail pointers for the queue 210 with internal memory of the data storage controller. The pointers maintained internally are referred to herein as internal pointers. In order to throttle the host, the data storage controller reports or exposes a different head pointer to the host. The pointers exposed to the host are referred to herein as external pointers (and may also be referred to as "fake" pointers as they differ from the "real" internal pointers). By reporting a head pointer to the host that differs from the internal head pointer, the data storage controller can thus establish an effective (or observed) queue depth (or queue depth value) that is different from the actual (or true) queue depth, with the effective queue depth chosen or adjusted to prevent timeouts, etc.

Notably, in each of the four exemplary scenarios of FIG. 2, because the circular queue 210 is empty, the internal head and tail pointers remain the same (as shown in scenario 202). However, the external head pointers 212 are adjusted in scenarios 204, 206 and 208 to throttle the host. Moreover, in the examples of FIG. 2, the external tail pointers are always the same as the internal tail pointers. That is, the tail pointer is not adjusted before it is exposed to the host. However, in other embodiments, both the head and tail pointers might be adjusted. Still further, note that FIG. 2 provides general implementation examples that do not necessarily incorporate certain unique features of NVMe. Some of those features are discussed below.

In the first scenario 202, with throttling disabled (i.e. No Submission Throttling), the external head and tail pointers are the same as the internal head and tail pointers (which, as noted, are both equal, thus indicating the queue is empty). By reading head and tail pointers that are the same, the host thereby determines that the queue 210 is empty and can be filled up to the maximum size of the queue (which in this particular example is sixteen entries). Hence, in the first scenario 202, the external head pointer reported to the host is not adjusted or changed relative to the actual internal head pointer and so no host throttling is performed. The effective queue depth is therefore the same as the actual queue depth (which, in this example, is sixteen). The host thus proceeds as normal, adding commands as needed to the submission queue 210.

In the second scenario, 204, i.e. Low Submission Throttling, the submission queue is throttled by half by setting the external head pointer 212 (reported to the host) so as to reduce the effective size of the queue in half. That is, in this example, even though the queue 210 is empty and all commands have already been completed, the data storage controller reports a head pointer 212 that is offset from the tail pointer 214 to provide an effective queue depth that is half the actual queue depth. In this particular example, the head pointer reported to the host is set (or adjusted) to be eight entries offset from the tail pointer to indicate that the queue 210 is half full, even though it is actually empty. Therefore, the host determines from the pointers that only eight new entries can be queued, i.e. the effective queue depth is now only eight. The host, in accordance with NVMe or other protocols, will not then attempt to queue more than eight new entries. This gives the data storage controller more time to complete the commands submitted by the host. And so, for example, if the data storage controller has reduced its processing speed in response to excessive heat, it should still have time to complete any newly queued entries (since no more than eight would be queued) before a timeout. If sixteen new entries were queued, the data storage controller might not have sufficient time.

In the third scenario, 206, i.e. High Submission Throttling, the submission queue is throttled even more, with the effective depth size now divided by four. Even though the queue 210 is again still empty, the data storage controller reports that the head pointer 212 is offset from the tail pointer 214 by twelve entries to indicate that the queue 212 is three-quarters full. Therefore, the host determines from the (external) head and tail pointers of scenario 206 that only four new entries can be queued. This gives the data controller even more time to complete any newly queued entries submitted by the host (since no more than four would be queued).

In the fourth scenario, 208, i.e. Extreme Submission Throttling, the submission queue is throttled still more, with the effective queue depth set (via the adjusted external head pointer 212) to only two. That is, in this example, the head pointer 212 is offset from the tail pointer 214 by fourteen entries within the illustrative sixteen entry queue to further limit the number of new entries that the host can submit to the queue. This provides the data controller with still even more time to complete any newly queued entries submitted by the host (since no more than two would be queued).

Note that, in the examples and scenarios of FIG. 2, for simplicity and clarity in describing host throttling, the illustrative circular queue is shown as empty in each case. It should be understood that the same procedures may be applied even when the queue is not empty, by reporting (or otherwise exposing) a head pointer to the host that is offset from the actual (internal) head pointer by some number of entries. And so, for example, if a sixteen entry queue is half full with entries that have yet to be completed, the internal head pointer for the queue would be offset by eight entries from the internal tail pointer. In that case, the adjusted (external) head pointer reported to the host might be further offset from the internal head pointer by four more entries to inform the host that the queue is three-quarters full, thereby achieving submission throttling. It should also be understood that the single sixteen entry queue of FIG. 2 is a simplified example of an actual set of submission queues, which, in practice, might include a large number of queues of greater or smaller sizes. Moreover, note that the NVMe standard cited above defines that a queue is full when the head pointer is one more than the tail pointer. That is, when using NVMe, the number of entries in a queue when full is one less than the maximum queue size. And so, when using NVMe, if the external head pointer is offset by fourteen from the tail pointer in a sixteen entry queue (as shown in the extreme throttling scenario 208 of FIG. 2), the host can then only queue one more command (not two). If the external head pointer were offset by fifteen in the sixteen entry queue, the host would then observe the queue as being full (under the NVMe standard) and would not queue any additional commands until more entries became available. Hence, the exact number of commands that can be queued by the host during throttling may depend on whether NVMe is implemented, as opposed to another protocol that might define a "full" queue differently.

Figure 3:
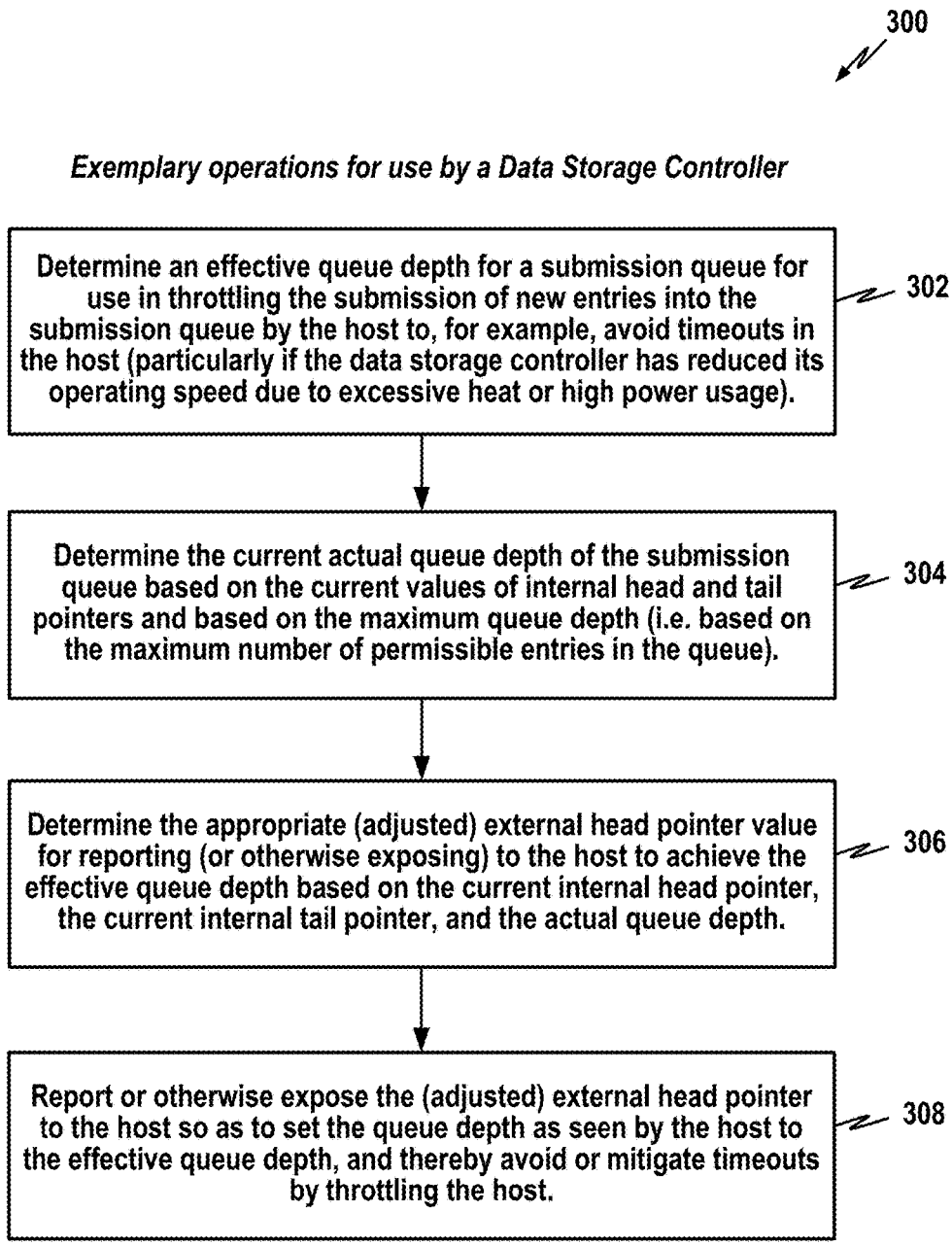
FIG. 3 is a flow chart summarizing the adaptively throttling by the data storage controller of the insertion of commands by the host device into its submission queues.

FIG. 3 summarizes some of these features via a flowchart 300. Briefly, at 302, the data storage controller determines an effective (modified) queue depth for a submission queue for use in throttling the submission of new entries into the submission queue by the host to, for example, avoid timeouts in the host (particularly if the data storage controller has reduced its operating speed due to excessive heat or high power usage). At 304, the data storage controller determines the current actual queue depth of the submission queue based on current values of internal head and tail pointers and based on the maximum queue depth of the submission queue. At 306, the data storage controller determines the appropriate (adjusted) external head pointer value for reporting (or otherwise exposing) to the host to achieve the effective queue depth based on the current internal head pointer, the current internal tail pointer, and the actual current queue depth. At 308, the data storage controller reports or otherwise exposes the (adjusted) external head pointer to the host so as to set the queue depth as seen by the host to the effective queue depth determined at 302, and to thereby avoid or mitigate timeouts or exceptions by throttling the host. (With NVMe, the completion entries do not report the tail pointer, which may be separately tracked by the host device using, e.g., doorbell resisters.)

Figure 4:
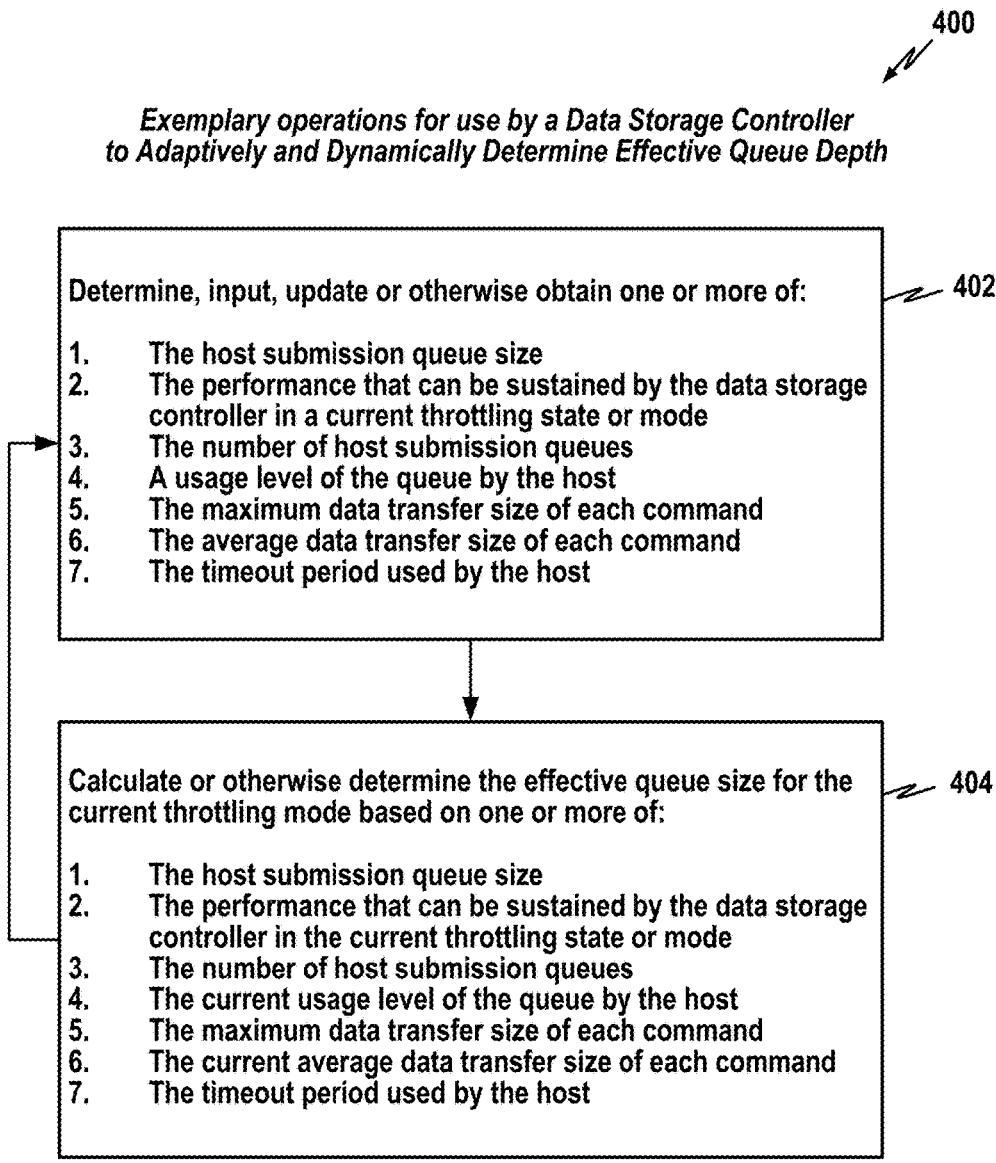
FIG. 4 is a flow chart summarizing a procedure for use by the data storage controller for determining an effective submission queue depth for use in throttling.

FIG. 4 summarizes an exemplary procedure 400 by which a data storage controller may adaptively and dynamically determines the effective (modified) queue depth. Briefly, at 402, the data storage controller determines, inputs, updates or otherwise obtains one or more of: (1) the host submission queue size; (2) the performance that can be sustained by the data storage controller in a current throttling state or mode; (3) the total number of host submission queues; (4) the usage level of the queue by the host; (5) the maximum data transfer size (MDTS) of each command; (6) the average data transfer size of each command; and (7) the timeout period used by the host before a timeout is declared.

Some of these parameters are obtained during initialization of the data storage controller and may remain unchanged until a next initialization, such as the host submission queue size, the number of host submission queues, and the maximum data transfer size of each command (which are all typically set by the host during initialization). Other parameters may vary dynamically with device usage and may be updated periodically or continuously by the data storage device, such as the usage level of the queue by the host and the average data transfer size of each command. The queue usage level may be assessed, for example, by determining an average or mean value for the number of entries in the host submission queue, or by assessing how often the host uses the queue, etc. The average data transfer size of each command may be assessed by tracking data transfer size values over time and then averaging the values. The performance that can be sustained by the data storage controller in a current throttling state or mode may be determined, for example, based on power usage. For instance, the NVM controller may be allowed to consume up to 10 watts but is actually consuming 11 watts. So, in this example, the device would seek a reduction of 1 watt and this might be achieved by reducing processing speed to 2 gigabytes per second from some higher rate (of say, 4 gigabytes per second).

At 404, the data storage controller then calculates or otherwise determines the effective (modified) queue size for the current throttling mode based on one or more of the foregoing parameters, i.e., based on (1) the host submission queue size; (2) the performance that can be sustained by the data storage controller in the current throttling state or mode; (3) the total number of host submission queues; (4) the current usage level of the queue by the host; (5) the MDTS of each command; (6) the current average data transfer size of each command; and (7) the timeout period used by the host. As indicated by the arrow of FIG. 4 leading from block 404 back to block 402, the operations of blocks 402 and 404 may be repeated in a loop to periodically (or continuously or on-demand) update the effective queue depth based on the latest values of the dynamic parameters to provide adaptive control of the effective queue depth in an attempt to prevent timeouts or exceptions within the host device.

With NVMe, the number of queues is, for example, set in the range of 2 to 128, with each queue configured to store between 2 and 64K entries. And so, in a particular illustrative example, there might be four submission queues, each configured to store 256 entries. The MDTS might be 128K. The timeout value may be ten seconds. Based on these fixed parameters and the various dynamic parameters discussed above, the data storage device might determine that, for its current temperature and power level, the effective queue depth for each individual submission queue should be set to 128 (rather than 256) so as to avoid any substantial risk of a timeout occurring in the host. These values are merely exemplary. It can be appreciated that timeout issues may be more commonplace when the submission queue size is much larger (e.g. up to 64K), as may be appropriate in hyperscale implementations. Nevertheless, timeout issues may still arise even with submission queue depths of only 64. In this regard, NVM data storage controllers may be programmed to put themselves into a sleep state if the controller detects excessive temperatures or high power consumption. Yet, depending upon the implementation, the host may not be aware that the NVM data storage controller is in a sleep state. As such, even a seemingly generous host timeout value of ten seconds or more might expire before commands are completed, and so throttling can help prevent or mitigate timeouts. Moreover, internal sleep times thus can be increased and/or maximized using throttling without impacting the host (with timeouts or exceptions).

In the following section, various NVMe-based throttling examples are described.

Exemplary NVMe Embodiments

The NVMe standard is based on a paired submission and completion queue mechanism. Commands are placed by host software into a submission queue. Completions are placed into the associated completion queue by the controller. Each host submission queue is a contiguous or non-contiguous ring buffer. During an initialization phase, the NVM data storage controller advertises its capabilities to the host device, which may include the maximum number of completion submission queues supported by the NVM data storage controller and the maximum depth of each queue (i.e. the maximum number of entries each queue can hold). The total combined depth of all submission queues defines a maximum submission queue depth. The host then creates the queues by specifying the type of the queue, queue size, queue addresses and other parameters. In an ordinary NVMe implementation, the queue depth is set during the initialization phase and is then not changed. As already explained, in the throttling examples described herein, the queue depth is adjusted or throttled.

During NVM usage, the host notifies the NVM data storage controller that commands are available in the queue by, e.g., issuing a memory write to a relevant doorbell register. This transaction holds the new value of the tail pointer. When the execution phase of a command has completed, the NVM data storage controller posts a completion queue entry to the host. The completion queue entry holds the updated value of head pointer for the associated submission queue. The value of the head pointer in the completion entry is the aforementioned external head pointer, since it is the value reported to the host. In this manner, the host determines when it is allowed to override previously used slots in the submission queue.

When submission queue throttling is not activated, the head pointer used in the completion queue entry is the real (internal) head pointer held in the NVM data storage controller (which takes into account all the entries already fetched from the submission queue and commands held internally in the device but not completed). The submission queue slots can be reused by the host since the device already fetched the required commands. When throttling is activated, the head pointer provided within the completion queue entry is adjusted, as explained above, to throttling the host by providing an effective queue depth that may differ from the actual (real) queue depth within the submission queues.

Figure 5:
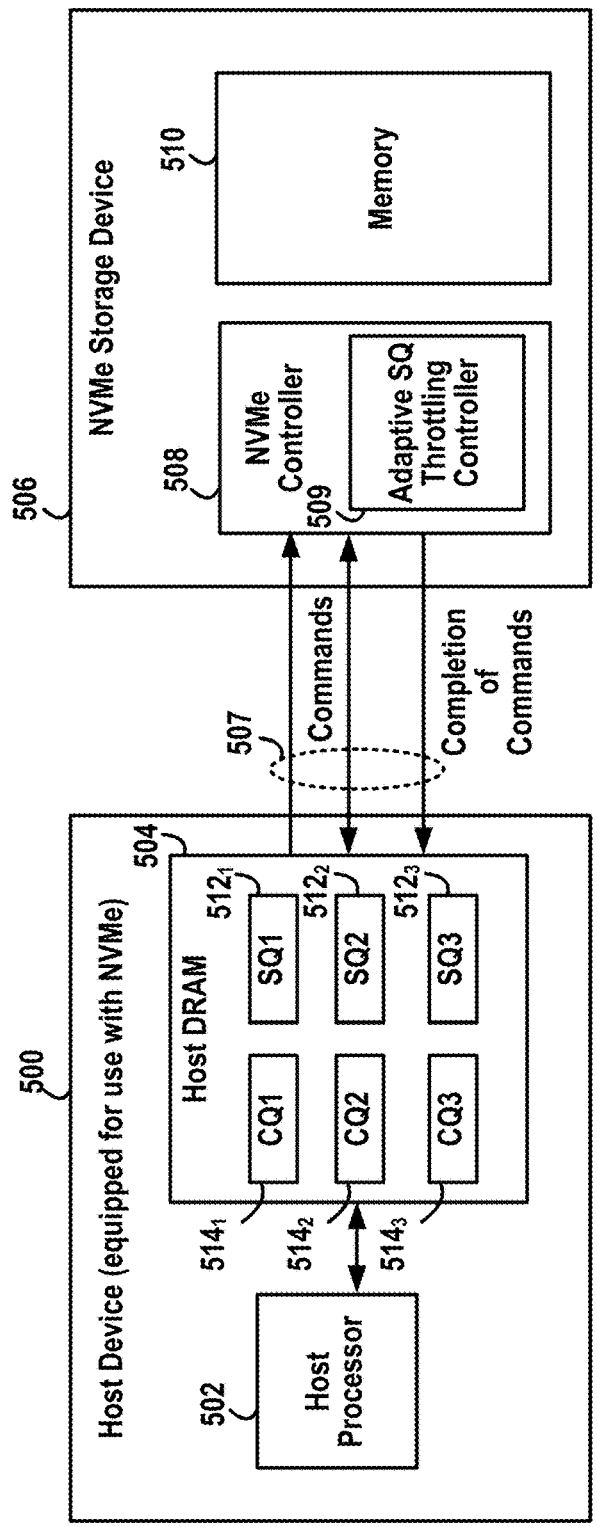
FIG. 5 illustrates a data storage system equipped for use with NVMe, where the controller adaptively throttles insertion of commands by the host into its submission queues.

FIG. 5 illustrates certain features of an exemplary NVMe architecture in which the above-described submission queue throttling of the host may be implemented. In FIG. 5, a host device 500 may be any suitable computing platform capable of accessing memory on a storage device using NVMe procedures. For example, host device 500 may be a desktop personal computer, a laptop computer, a tablet computer, a mobile telephone, or a front end to a storage array. The host device 500 includes a processor 502 and an internal memory 504, which in this example is dynamic random access memory (DRAM). The host device 500 may store data in an NVMe storage device 506. The NVMe device 506 may be any suitable device that provides non-volatile memory storage for host device 500 in accordance with NVMe standards. For example, the NVMe device 506 may be a removable storage device, such as a solid state drive (SSD) that is removably connectable to host device 500. In another example, the NVMe device 506 may be non-removable or integrated within the host device 500. In some embodiments, the host device 500 and the NVMe device 506 are communicatively connected via a PCIe bus (represented via the set of arrows 507).

The NVMe storage device 506 of FIG. 5 includes an NVMe controller 508 and a non-volatile memory 510. The NVMe controller 508 controls access to the non-volatile memory 510 such as a NAND. The NVMe controller 508 thus may be a non-volatile memory controller that implements or supports the NVMe protocol, and non-volatile memory 510 may be 2D or 3D NAND flash memory. The NVMe controller includes an adaptive submission queue (SQ) throttling controller 509, which controls SQ throttling, as already discussed. In this regard, for the host device 500 to read data from or write data to the NVMe storage device 506, the host processor 502 creates and writes commands in submission queues SQ1 $512_1$, SQ2 $512_2$, and SQ3 $512_3$. Three submission queues are shown for illustrative purposes. There may be more or fewer submission queues at any given time depending on NVMe device usage by the host system. The effective (modified) queue depth of the SQs is controlled as discussed above to prevent timeouts or other exceptions within the host 500. The NVMe controller 508 fetches commands from the submission queues $512_1$, $512_2$, and $512_3$ and executes the commands Upon completion of the commands, the NVMe controller 508 writes completion entries that are ultimately directed to completion queues CQ1 $514_1$, CQ2 $514_2$, and CQ3 $514_3$. In some examples, each of the completion queues $514_1$, $514_2$, and $514_3$ is a circular buffer with a fixed 16 byte slot size that is configured to post completion entries (e.g., entries that indicate status of completed commands). In some embodiments, during an initialization phase, the host device 500 may create the set of submission queues (e.g., the queues $512_1$, $512_2$, and $512_3$) and the corresponding set of completion queues (e.g., the queues $514_1$, $514_2$, and $514_3$).

Figure 6:
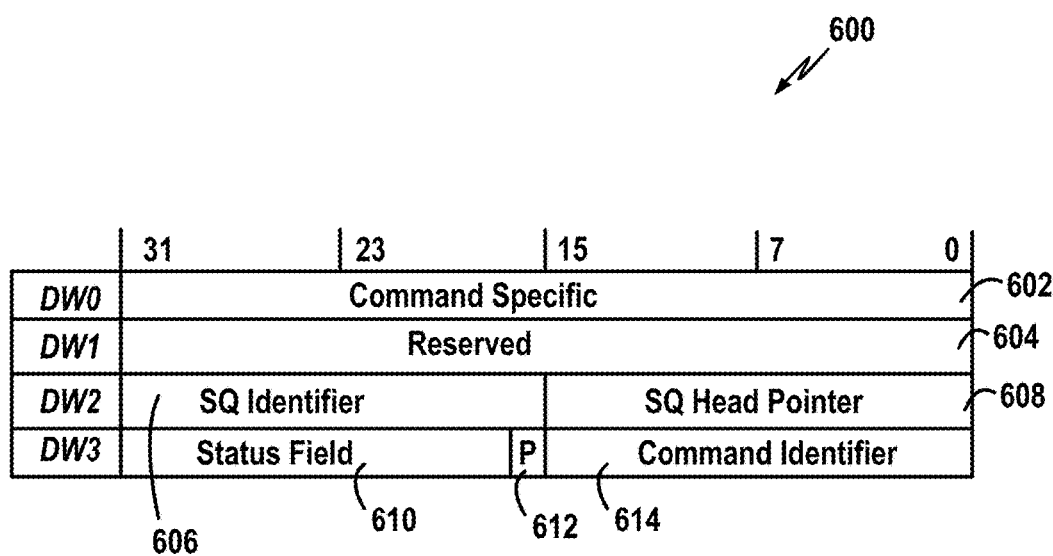
FIG. 6 illustrates an exemplary NVMe completion entry for processing by the system of FIG. 5, and particularly illustrating a reported head pointer that may be adjusted by the NVM controller to reduce the submission queue depth as observed by the host device.

FIG. 6 illustrates an exemplary structure of a completion entry 600 for a particular command issued to the NVMe storage device of FIG. 6. The completion entry 600 contains data for writing (or posting) a completed command to a designated completion queue (CQ) on the host device (such as one of the completion queues of FIG. 5). As shown in FIG. 6, completion entry 600 includes a set of data fields including a command specific field 602, a reserved field 604, a submission queue (SQ) identifier field 606, a SQ head pointer field 608, a status field 610, a 'P' field 612, and a command identifier field 614. The SQ head pointer field 608 stores the external head pointer that is reported (or exposed) to the host, which may differ from the actual (internal) head pointer, as already explained. The fields are configured to contain data values based on the type of command associated with completion entry 600. For example, for non-admin commands, a command specific field 602 and a Status field 610 of completion entry 600 are cleared to a zero value (unless an error occurs). For example, command specific field 602 contains zeroes if the associated command is an operational I/O command, such as a read command or a write command. In contrast, if the command is an admin command (or an error), command specific field 602 contains non-zero information in accordance with the admin command (or additional information indicative of the error).

Figure 7:
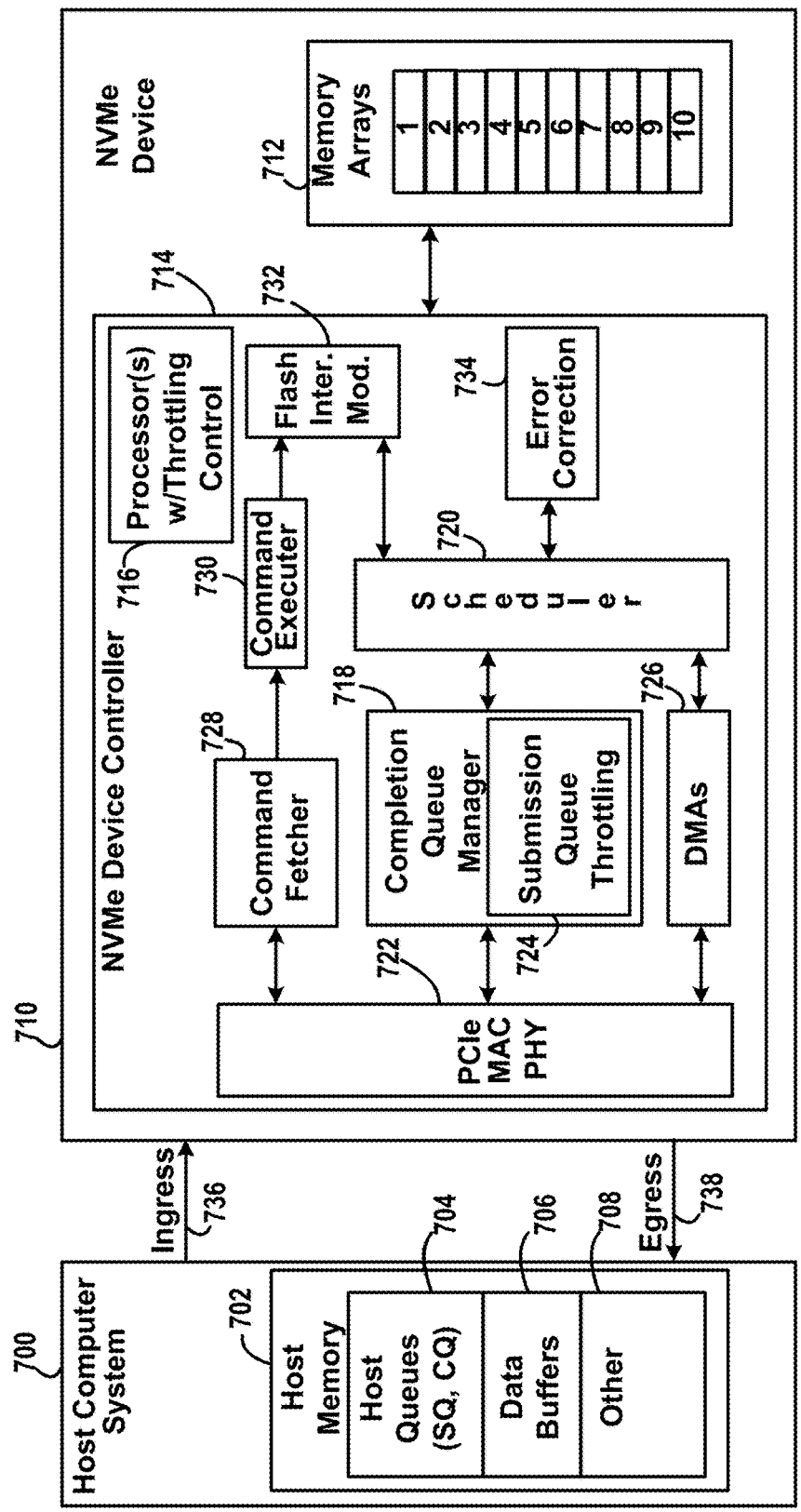
FIG. 7 further illustrates the exemplary NVMe data storage system of FIG. 5.

FIG. 7 illustrates further details of an exemplary NVMe system. In FIG. 7, a host computer system 700 includes host memory 702, which includes host queues 704 (such as the aforementioned SQ and CQ queues), data buffers 706, and other memory components 708. An NVMe device 710 includes memory arrays 712 and an NVMe device controller 714. The NVMe controller 714 includes one or more processors 716, one of which may be equipped to control submission queue throttling by, e.g., determining the effective queue depth, as discussed above. The processors are also responsible for the execution of Frond-End and Back-End tasks. A completion queue manager 718 is responsible for managing the host completion queues. Among other functions, the completion queue manager 718 routes completion entries received from a scheduler 720 to a completion queue within the host device 700 via a PCIe MAC PHY interface 722 while throttling the host's insertion of new entries into the SQs 704 using a submission throttling component 724, which, as explained, may report a different head pointer value to the host 700 than the actual head pointer maintained by the NVMe device 710.

Actual pages of data to be delivered to the host device (such as the result of read commands) are delivered using one or more DMAs 726. Additional components of the NVMe controller 714 shown in FIG. 7 include a command fetcher 728, which is responsible for fetching and parsing the commands from the host and queuing them internally, a command executer 730, which is responsible for the arbitrating and executing the commands, a flash interface module 732, which is responsible for controlling and accessing the memory arrays, and an error correction module 734, which is responsible for error correction. Ingress and egress from the NVMe device 710 is illustrated via arrows 736 and 738.

Note that, in an exemplary implementation, the only components that are modified relative to conventional NVMe are the completion queue manager 718 and the processor(s) 716. The throttling described herein is otherwise transparent to all other components of the NVMe device 710, as well as the host device 700. That is, only minimal changes are made to otherwise standard NVMe systems to implement the host submission queue throttling.

Figure 8:
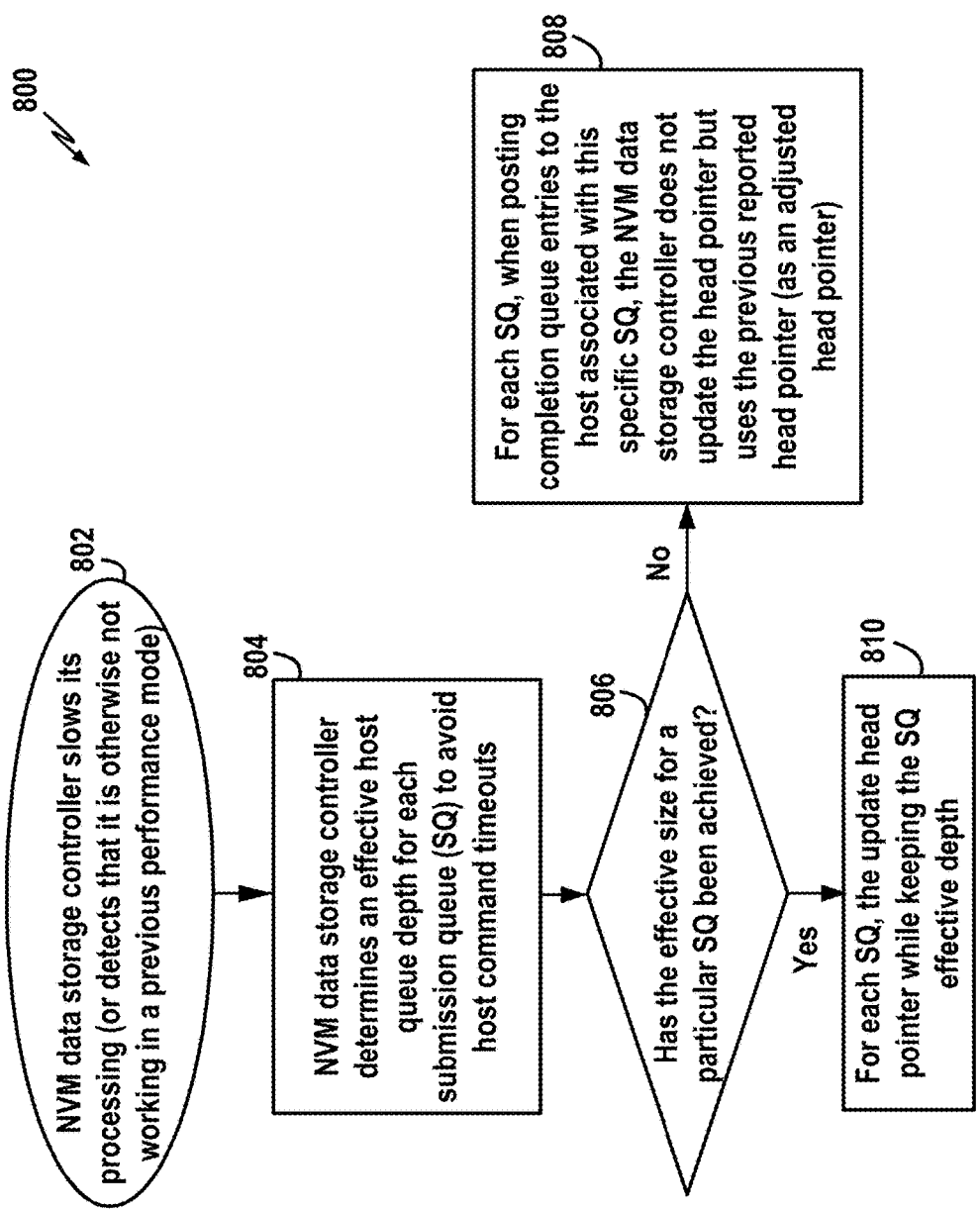
FIG. 8 is a flow chart illustrating selected features of the throttling procedure of the data storage controller of FIG. 7, and particularly illustrating an exemplary method for achieving a target "effective queue depth" by adjusting the value of the head pointer.

FIG. 8 is a flowchart 800 illustrating an exemplary procedure for increasing throttling so as to slow down the insertion by a host of new entries into a submission queue. Briefly, processing begins with the decision by the NVM data storage controller to slow down the host by increasing the throttling level. There may be various reasons for this decision but, as noted above, it may be a thermal issue (i.e. excessive heating). Then, the NVM data storage controller determines the effective (modified) host queue depth that can be sustained for this throttling level. Based on the effective queue depth, the NVM data storage controller allocates the effective queue depth to each submission queue. Next, the NVM data storage controller achieves the selected effective queue size for each SQ by not updating the head pointers for the SQ and instead using the previous head pointers. Once the pre-determined effective queue depth is achieved, the NVM data storage controller begins updating the head pointers (while not exceeding the effective queue depth allocated for each host submission queue).

More specifically, beginning at 802, an NVM data storage controller (or other suitable device) decides to slow its processing perhaps due to excessive heat (or detects that it is otherwise not working in a previous performance mode). In response, at 804, the NVM data storage controller determines an effective host queue depth for each submission queue (SQ) to avoid host command timeouts or other exceptions (or to otherwise prevent the NVM data storage controller from being exposed to any such timeouts). See, the discussions above of FIG. 4 for exemplary methods for determining effective queue depth. At decision block 806, the NVM data storage controller determines whether, for each particular SQ, the corresponding effective SQ depth had been achieved. If, at 806, the SQ effective size has not yet been achieved, processing proceeds to block 808 where, for each SQ, when posting new completion queue entries to the host associated with the specific SQ, the NVM data storage controller does not update the (external) head pointer (i.e. the head pointer reported in the next completion entry) but instead uses the previous reported head pointer as a new head pointer. This has the effect of reducing the number of actual entries in the SQ toward the effective queue depth. Once the SQ effective queue depth has been achieved for a particular SQ, the NVM data storage controller, at 810, updates the head pointer (i.e. the external head pointer reported in the next completion entry) for that particular SQ while keeping the SQ effective depth determined at 804. Blocks 806, 808 and 810 are performed for each submission queue (SQ). Processing continues in accordance with block 810 until the NVM data controller decides to change its performance mode by, for example, increasing or decreasing the overall throttling level.

Figure 9:
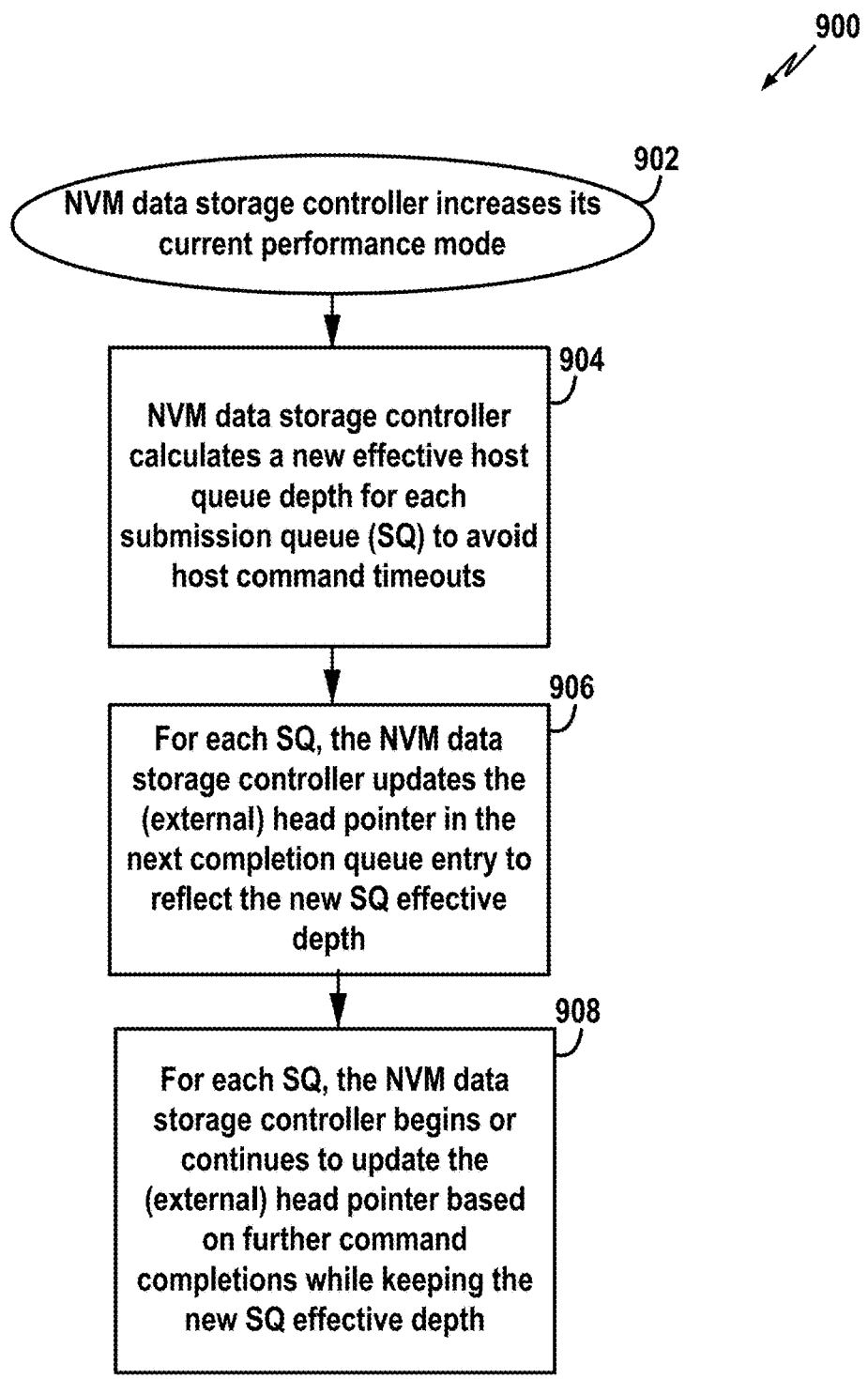
FIG. 9 is a flow chart illustrating other selected features of the throttling procedure of the data storage controller of FIG. 7, and particularly illustrating an exemplary method for increasing a performance mode of the controller by reducing throttling.

FIG. 9 is a flowchart 900 illustrating an exemplary procedure for decreasing or cancelling the throttling of the host. Briefly, processing begins with the decision by the NVM data storage controller to increase its performance and reduce the throttling level. This may occur, for example, when the NVM data storage controller recovers from a previous condition that caused it to entering a throttling mode (such as excessive heat). Then, the NVM data storage controller calculates a new effective host queue depth that can be sustained under the new conditions while not triggering host command timeouts. Based on that determination, the NVM data storage controller allocates the new effective queue depth to each submission queue. Next, for each submission queue, the NVM data storage controller updates the allowed head pointer (i.e. the external head pointer reported to the host within the next completion entry) while not exceeding the new effective submission queue depth. Finally, the NVM data storage controller begins to update the head pointers reported (or otherwise exposed) to the host while not exceeding the new effective queue depth allocated for each host submission queue.

More specifically, beginning at 902, an NVM data storage controller (or other suitable device) decides to increase its performance by decreasing throttling. In response, at 902, the NVM data storage controller determines a new effective (modified) host queue depth for each submission queue (SQ) sufficient to avoid host command timeouts or other exceptions (or to otherwise prevent the NVM data storage controller from being exposed to any such timeouts). At 906, for each SQ, the NVM data storage controller updates the (external) head pointer in the next completion queue entry to reflect the new SQ effective depth. At 908, for each SQ, the NVM data storage controller then begins to or continues to update the (external) head pointer based on further command completions while keeping the new SQ effective depth. That is, blocks 906 and 908 are performed or repeated for each submission queue (SQ). Processing continues in this manner until the NVM data controller decides to again change its performance mode by, e.g., increasing or decreasing the overall throttling level. Note that, if at block 902, the NVM data storage controller has decided to increase its current performance mode back to a non-throttling mode (i.e. the NVM data storage controller has decided to cancel throttling), the operations of blocks 904-908 are suspended or deactivated. The effective queue depth for each SQ is again set equal to the actual queue depth for the SQ and the external head pointers are set equal to the internal head pointers, so that no throttling is performed.

Figure 10:
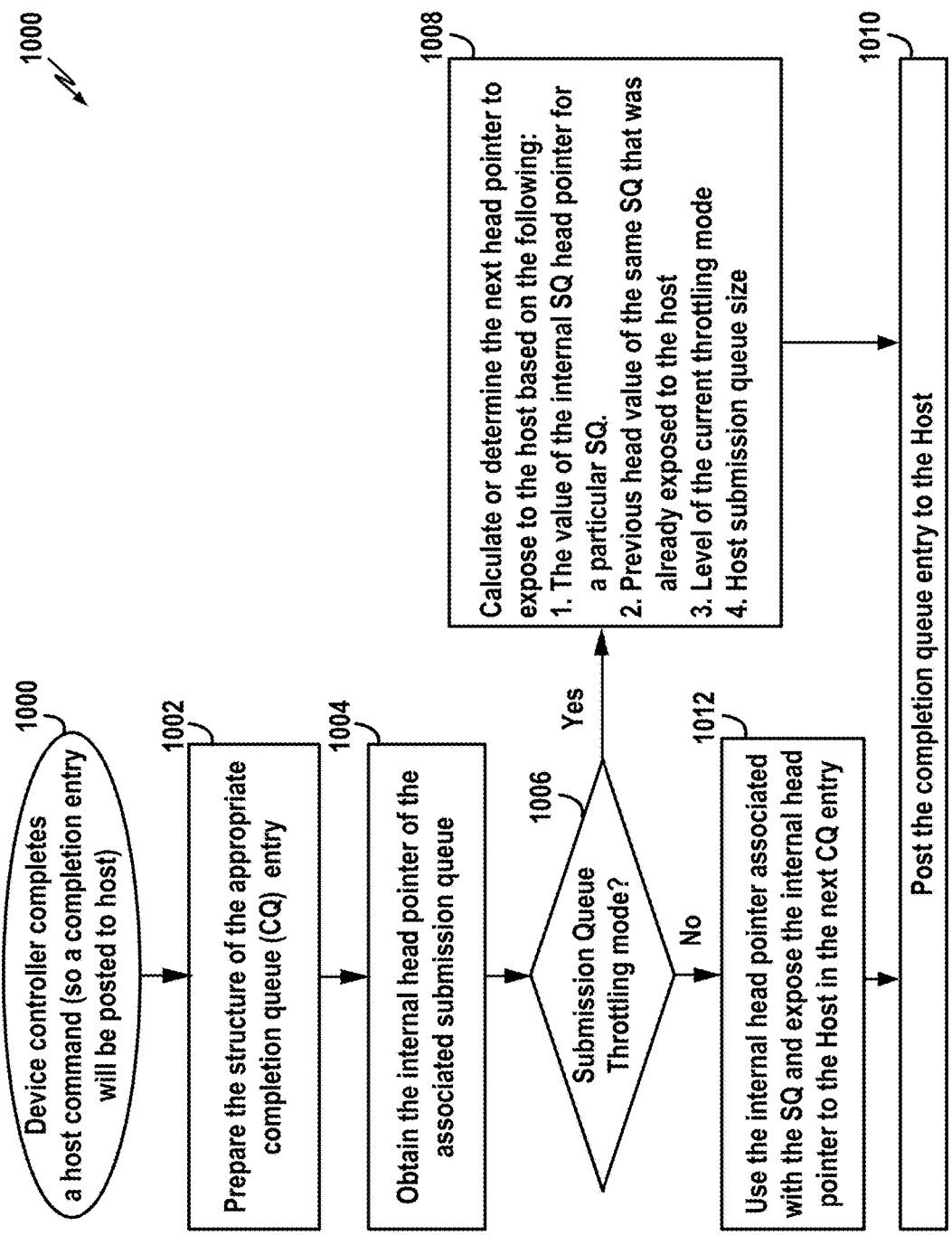
FIG. 10 is a flow chart illustrating other selected features of the throttling procedure of the data storage controller of FIG. 7, and particularly illustrating an exemplary method for controlling the effective queue depth of the submission queue using the head pointer.

FIG. 10 is a flowchart 1000 illustrating an exemplary procedure for posting a completion queue entry to the host disclosed in this invention. Briefly, the procedure begins by completing the execution phase of a command and receiving an internal request for posting a completion queue entry to the host. The NVM data storage controller prepares the structure of the completion entry while gathering or inputting the relevant information including the relevant submission queue head pointer implemented in the NVM data storage controller. As already explained, when not in throttling mode, the completion entry is posted to the host while exposing the real (internal) head pointer stored in the NVM data storage controller. When in a throttling mode, the NVM data storage controller generates a different (external) head pointer for posting to the host in a completion entry. The external head pointer is set so that the host queue depth for the corresponding specific submission queue will not exceed a pre-defined threshold (set based on the effective queue depth for the submission queue).

More specifically, beginning at 1002, an NVM data storage controller (or other suitable device) completes a host command and so a completion entry will be posted to host. At 1002, the NVM data storage controller prepares the structure of the appropriate completion queue (CQ) entry. At 1004, the NVM data storage controller obtains the internal head pointer of the associated submission queue. Then, if the NVM data storage controller is in a throttling mode (as determined at decision block 1006), the NVM data storage controller proceeds to block 1008 where the NVM data storage controller calculates or determines the next head pointer for a particular SQ to expose (e.g. report) to the host based on one or more of the following: 1) the value of the internal SQ head pointer; 2) the previous head value of the same SQ that was already exposed (e.g. reported) to the host; 3) the level of the current throttling mode; and 4) the host submission queue size for the particular SQ. Then, at 1010, the NVM data storage controller posts the completion queue entry to the host (with the external head pointer as determined in block 1008). However, if at 1006, the NVM data storage controller is not in a throttling mode, processing instead proceeds to block 1012 where the NVM data storage controller uses the internal head pointer associated with the SQ and exposes (e.g. reports) the internal head pointer to the host in the next CQ entry (via block 1010). The procedures of FIG. 10 may be repeated for each new command completion to configure each new CQ entry depending upon whether or not throttling is currently being performed.

In an NVMe implementation, the host timeout mechanism might be implemented in a higher level of a processing stack (which is on top of an NVMe driver). There might be two values for host timeouts. For normal commands (such as reads and writes), the host timeout is often on the order of sixty seconds, while for special and specific commands (including at least some admin commands), the timeout is often shorter and is on the order of ten seconds. More, some host devices may set the timer only for some commands but not others. For instance, the timer might be active for flash commands or write commands, but not other commands. As such, it may be useful to detect or predict when the host will issue a timer. The NVM controller may perform throttling only for some commands and not others. For example, commands that are subject to a timeout may be completed promptly by the NVM controller, while other commands may be throttled or delayed and, in some examples, re-fetched later.

Figure 11:
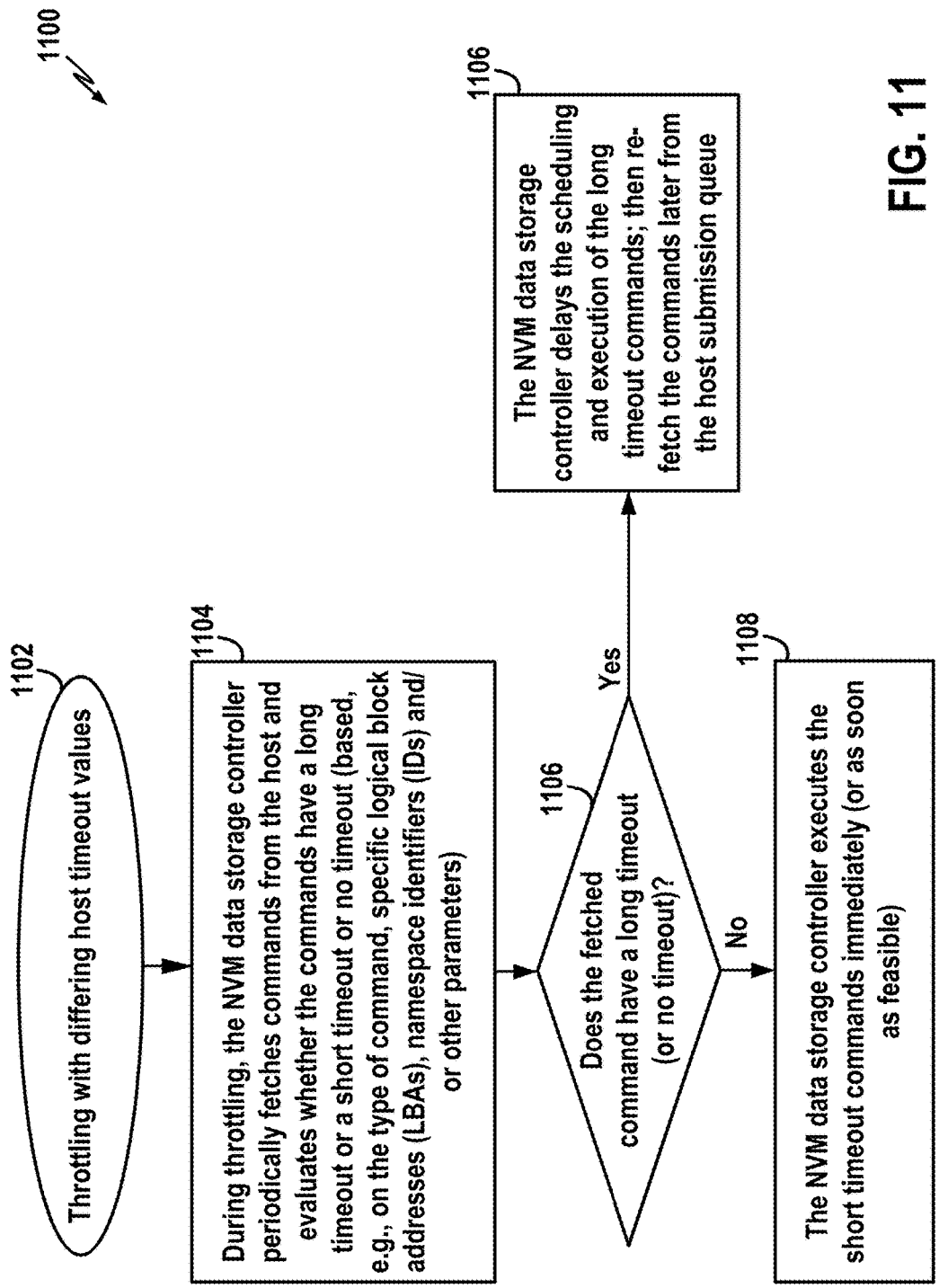
FIG. 11 is a flow chart illustrating other selected features of the throttling procedure of the data storage controller of FIG. 7, and particularly illustrating throttling as applied to host devices that employ two different timeout values, one much longer than the other.

FIG. 11 illustrates an alternative processing example 1100 that takes differing host timeout values into account (as well as cases where some commands are subject to a timeout value while others are not). Briefly, in this alternative example, the NVM data storage controller makes sure that at least one additional command can be fetched from the host submission queue and held in the device. At specific windows during throttling, the NVM data storage controller fetches commands from the host and evaluates whether those commands have the long timeout, the short timeout, or not timeout (based on the type of command, specific logical block addresses (LBAs), namespace identifiers (IDs) and/or other parameters). This evaluation thus serves to predict whether similar commands will be subject to long or short timeouts (or subject to no timeout). For commands that are determined to have the longer timeout (or no corresponding timeout), the scheduling and executing of the commands is delayed by the NVM data storage controller, since they are not urgent. Those particular commands may then be re-fetched from host submission queues by the NVM data storage controller later, if needed. Commands that are evaluated as having the shorter timeout (or having a set timeout rather than no timeout) are executed by the NVM data storage controller immediately (or as soon as is feasible). This alternative implementation may be combined with the embodiments described above or implemented separately.

More specifically, as shown in FIG. 11, beginning at 1102, the NVM data controller (or other suitable device) is set or programmed to take different duration host timeouts into account. At 1104, during throttling, the NVM data storage controller then periodically fetches commands from the host and evaluates whether the commands have a relatively long timeout or a relatively short timeout or no timeout (based, e.g., on the type of command, specific LBAs, namespace IDs and/or other parameters). If, within decision block 1106, the NVM data storage controller determines that the fetched command has no timeout or a relatively long timeout (e.g. sixty seconds rather than ten seconds), processing proceeds to block 1106 where, the NVM data storage controller delays the scheduling and execution of the long timeout commands (or the no timeout commands), then re-fetches the commands later, if needed, from the host submission queue. Otherwise, at 1108, the NVM data storage controller executes the relatively short timeout commands immediately (or as soon as feasible).

Note that at least some host devices are configured to separately track the device queue depth and, in such devices, artificially lowering queue depth (below some threshold) might cause the host to conclude that the reduced queue depth indicates a problem with the NVM data storage controller and to issue a reset or take other problematic actions. For such hosts, it thus may be useful to limit the amount of queue depth reduction exposed by the NVM data storage controller to the host or, in some cases, to disable the throttling feature. For hosts that may adversely respond to a reduction in queue depth, it can be useful to advertise the throttling capability to the host to allow the host to select whether to permit throttling or not. This may involve appropriate and minor modifications to drivers within the host.

Additionally or alternatively, the device controller may drip command completions to the host during periods of throttling so the host can detect that the NVM data storage controller is processing commands slowly and so the host will not issue the reset. By "drip" it is meant that the NVM data storage controller posts command completions via the completion queues of the host at an intentionally slow rate based, e.g., on a programmable drip rate value. Still further, the throttling may be employed in a relatively conservative manner by, for example, enabling the throttling feature gradually. That is, the NVM data storage controller initially only slightly throttles the host (by, e.g., only slightly reducing queue depth) and if no timeouts are triggered, the NVM data storage controller throttles the host in a more aggressive manner (by, for example, reducing queue depth by a greater amount). If the NVM data storage controller is nevertheless reset by the host, the throttling feature can be automatically disabled in the NVM data storage controller for future operations for this particular host.

Figure 12:
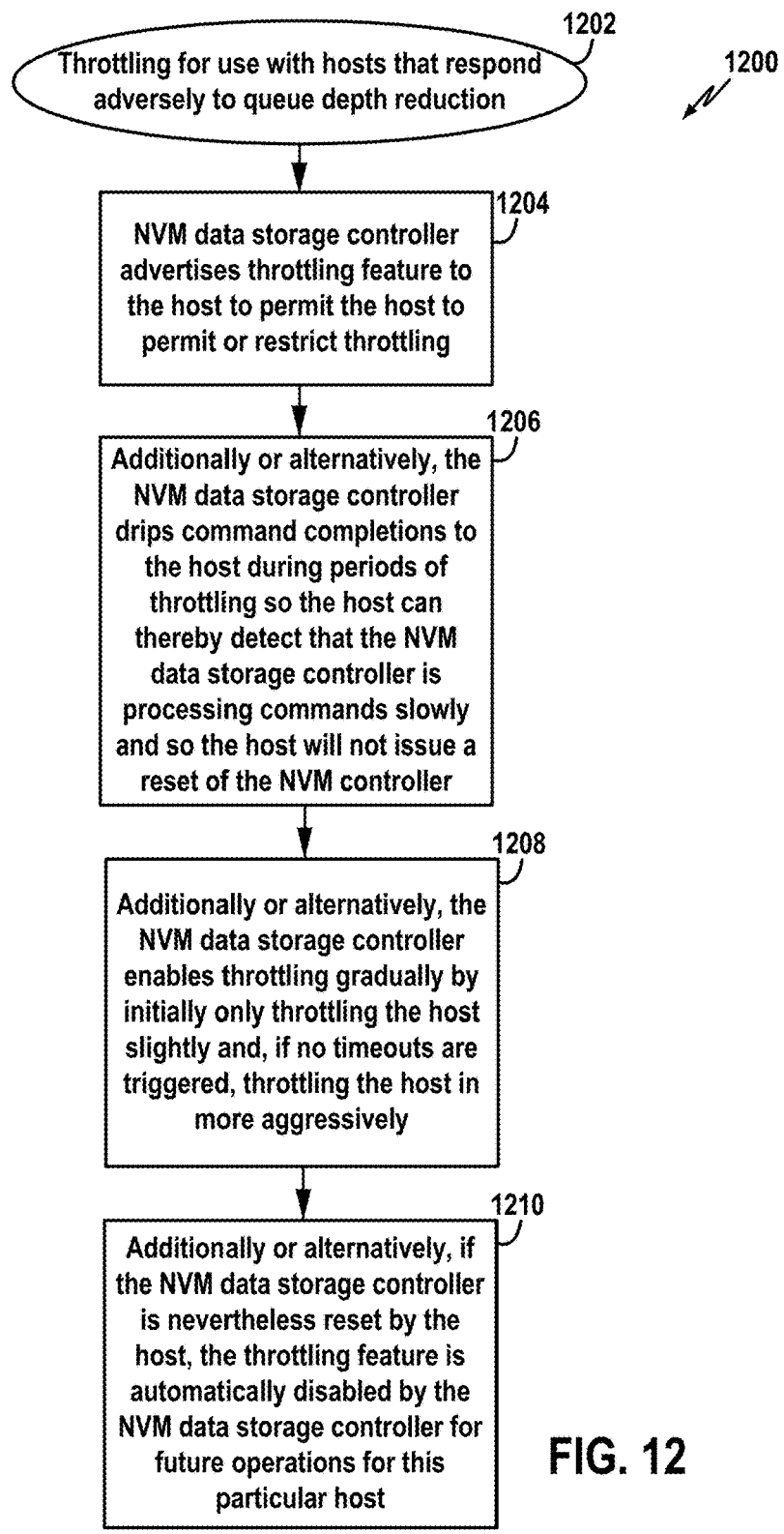
FIG. 12 is a flow chart illustrating other selected features of the throttling procedure of the data storage controller of FIG. 7, and particularly illustrating procedures for use with host devices that may respond adversely to an artificial reduction in submission queue depth.

These features are summarized in the flowchart 1200 of FIG. 12, which illustrates throttling procedures 1202 for use with hosts that may respond adversely to artificial queue depth reduction. Briefly, at 1204, the NVM data storage controller advertises its throttling feature to the host to permit the host to permit or restrict throttling. At 1206, additionally or alternatively, the NVM data storage controller drips command completions to the host during periods of throttling so the host can detect that the NVM data storage controller is processing commands slowly (so the host will not issue the reset). At 1208, additionally or alternatively, the NVM data storage controller enables throttling gradually by only throttling the host slightly and, if no timeouts are triggered, throttling the host more aggressively. At 1210, additionally or alternatively, if the NVM data storage controller is nevertheless reset by the host, the throttling feature is automatically disabled by the NVM data storage controller for future operations for this particular host to, for example, prevent the host from disabling any future usage of the NVM data storage controller under the erroneous conclusion that the NVM data storage controller is malfunctioning or is otherwise incompatible with the host.

Thus, methods and apparatus have been described that provide for an adaptive host queue depth, as controlled by an NVM data storage controller or other device controller. The NVM data storage controller may throttle the host by changing dynamically the effective depth of each host submission queue. This may be accomplished by generating "fake" head pointers to be reported to the host while sending or posting command completion entries. Among other features, these methods and apparatus provide: (1) detection of entering a throttling mode and a manner of exiting it; (2) determination of the required host queue depth that the device can sustain without being exposing to command timeouts from the host side; (3) allocation of effective submission queue depths based on the host queue depth; and (4) a procedure or mechanism to allow the NVM data storage controller to throttle the host using the head pointer.

Among other advantages, the exemplary procedures described herein may serve to (1) achieve a power consumption reduction (particularly since power consumption may be reduced while in extreme throttling scenarios such as during excessive temperatures); and (2) provide protection from exception scenarios or timeouts from the host.

Further Exemplary Methods and Embodiments

FIGS. 13-16 illustrate and summarize various general features of exemplary data storage controllers and methods, or procedures for use with data storage controllers.

Figure 13:
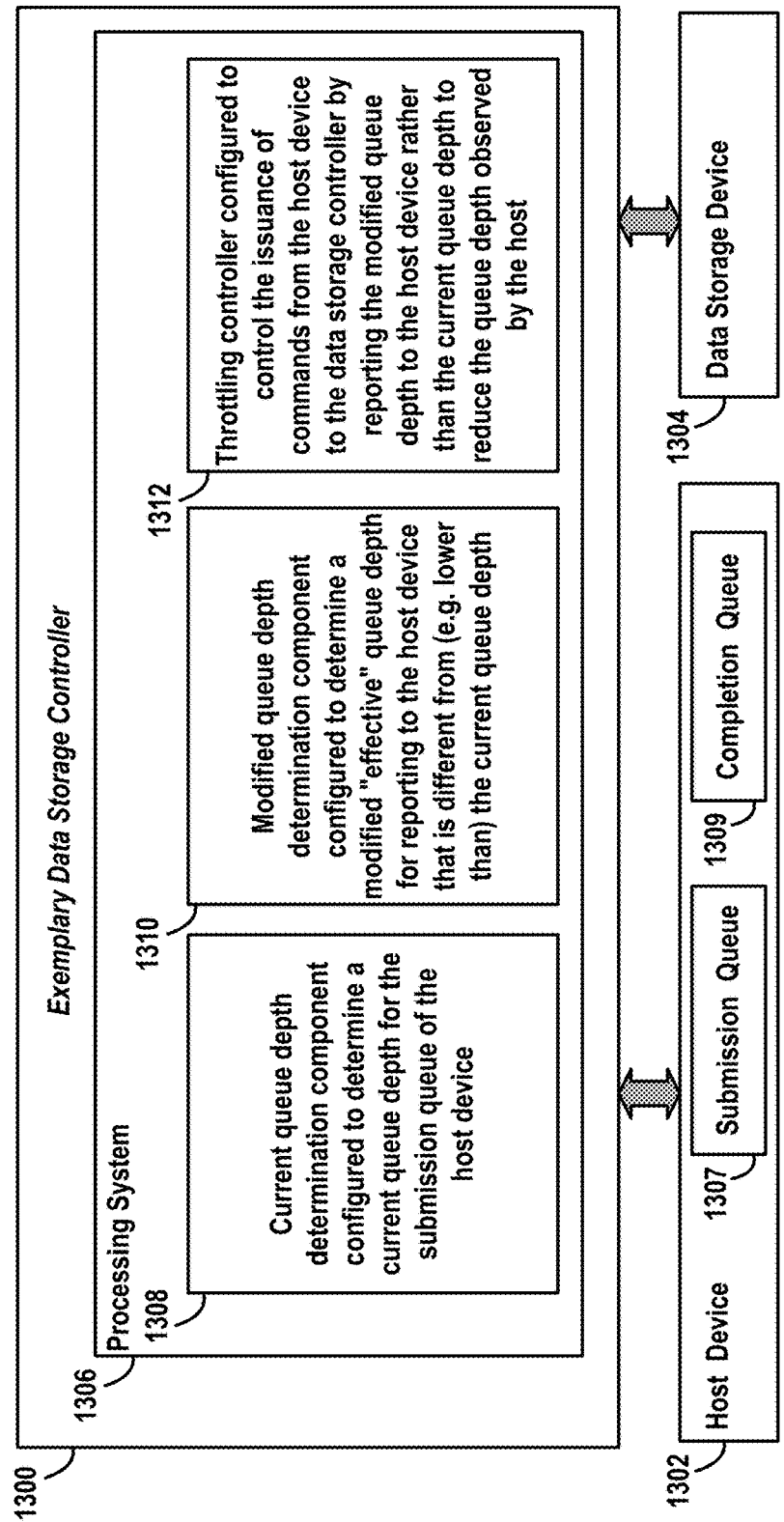
FIG. 13 is a block diagram summarizing selected features of a data storage controller equipped to throttle the insertion of memory access commands by a host device into its submission queues to, for example, reduce a risk of timeouts within the host device.

FIG. 13 shows an exemplary data storage controller 1300 (or memory controller or device controller) configured to communicate with a host device 1302 and a data storage device 1304, wherein the data storage controller 1300 may access the data storage device 1304 based on commands issued to the data storage controller 1300 by the host device 1302. Although many examples described herein relate to NVMe controllers for storing data within NAND devices, the data storage device 1304 may be any suitable memory or storage device and is not limited to NANDs, and the data storage controller 1300 may be any suitable memory controller device and is not limited to NVMe-based controllers.

The exemplary data storage controller 1300 of FIG. 13 includes a processing system 1306 configured for: (a) controlling storage, retrieval and/or erasure of data within the memory device 1304; (b) obtaining memory access commands or other commands from one or more submission queues 1307 of the host device 1302; and (c) posting or delivering completion entry values to the host device 1302 via one or more completion queues 1309. In particular, the exemplary processing system 1306 includes a current queue depth determination component or controller 1308 configured to determine a current queue depth for the submission queue 1307 of the host device 1302. The processing system 1306 further includes a modified queue depth determination component or controller 1310 configured to determine a modified "effective" queue depth for reporting to the host device 1302 (via the completion queue 1309) that is different from (e.g. lower or less than) the current queue depth within the submission queue 1307. The processing system 1306 still further includes a throttling component or controller 1312 configured to control the issuance of commands from the host device 1302 to the data storage controller 1300 by reporting the modified queue depth to the host device 1302 via the completion queue 1309 rather than the current queue depth to reduce the queue depth (of the submission queue 1307) as observed by the host device 1302.

Figure 14:
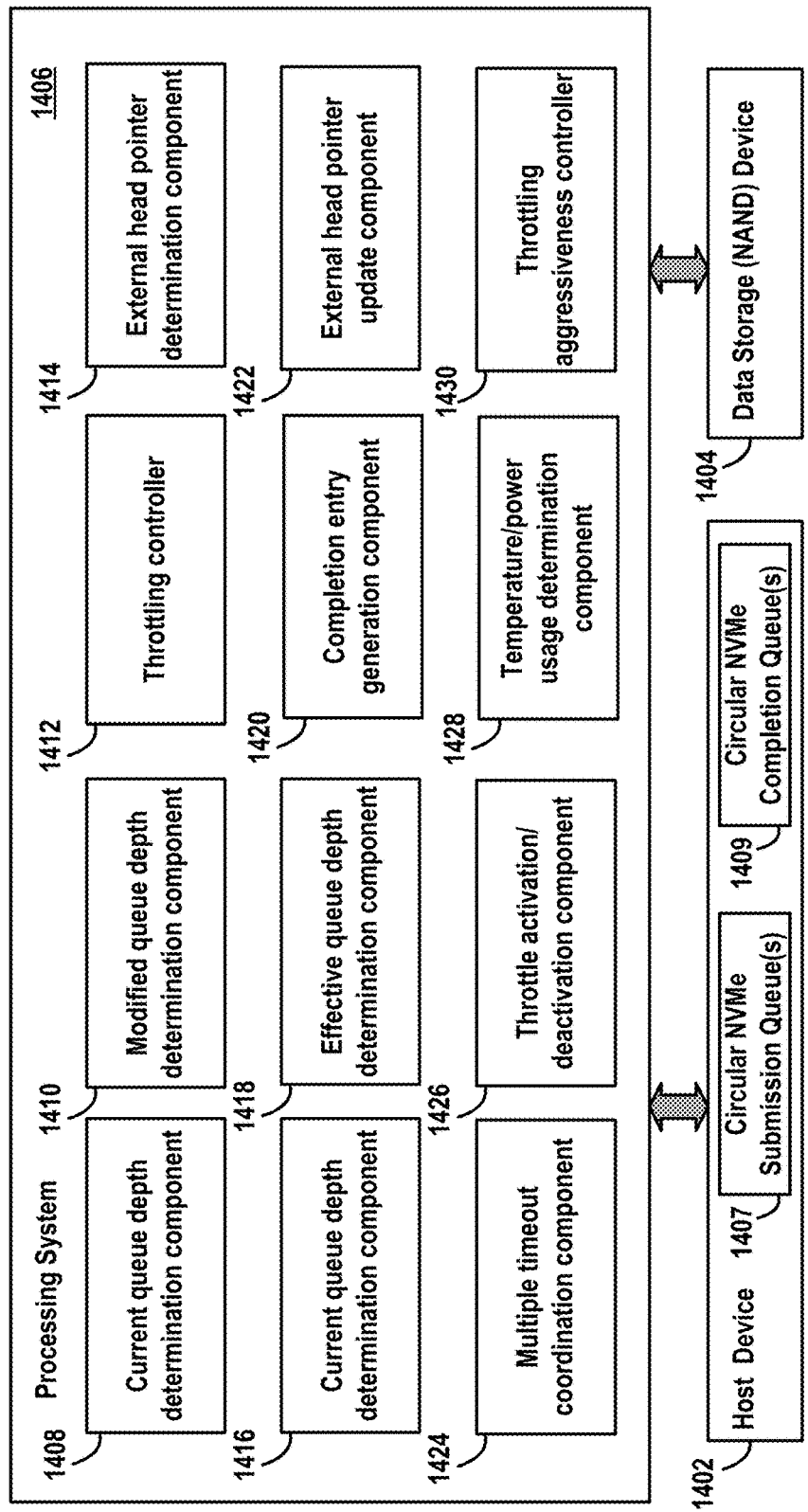
FIG. 14 is a block diagram summarizing further selected features of the data storage controller of FIG. 13 equipped to throttle the insertion of memory access commands by the host device into its submission queues and to perform other functions or procedures.

FIG. 14 illustrates additional or alternative components of an exemplary processing system 1406 configured to control communications with a host device 1402 and a data storage device 1404. In the example of FIG. 14, the host device 1402 includes one or more circular NVMe submission queues 1407 and one or more circular NVMe completion queues. The data storage device 1404 is a NAND. The processing system 1406 of FIG. 14 again includes: a current queue depth determination component or controller 1408 configured to determine a current queue depth for the submission queue 1407; a modified queue depth determination component or controller 1410 configured to determine a modified "effective" queue depth for reporting to the host device 1402; and a throttling component or controller 1412 configured to control the issuance of commands from the host device 1402 by reporting the modified queue depth to the host device 1402.

Additionally, the processing system 1406 of FIG. 14 includes an external head pointer determination component 1414 configured to determine the external head pointer value for reporting to the host device 1402 based on a current internal head pointer value and an effective queue depth. A current queue depth determination component 1416 is configured to determine the current queue depth of a submission queue 1407 by determining the current queue depth for the submission queue 1407 based on a current value of an internal head pointer for the submission queue 1407, a current value of an internal tail pointer for the submission queue 1407, and a maximum queue size for the submission queue 1407. The internal head and tail pointer and the value of the maximum queue size may be stored in internal memory (not shown in FIG. 1 4) of the data storage controller.

Still further, the processing system 1406 of FIG. 14 includes an effective queue depth determination component or controller 1418 configured to set the effective queue depth to a value sufficient to reduce a risk of a timeout within the host device 1402 arising due to failure of the data storage controller (in which the processing system 1406 is installed) to complete an issued command within an allotted time limit. The effective queue depth determination component 1418 may be configured to determine the effective queue depth based on one or more of: (1) a maximum size of the queue; (2) a performance level that can be sustained by the data storage controller in a current operating mode; (3) a number of other queues if there is more than one queue; (4) a current usage level of the queue by the host device; (5) a maximum data transfer size of each command; (6) a current average data transfer size of each command; and (7) a timeout period used by the host.

A completion entry generation component or controller 1420 is configured to generate a completion entry that includes the external head pointer for posting within the completion queue 1409. An external head pointer update component or controller 1422 is configured to determine whether the current queue depth of the submission queue 1407 is the same as the effective queue depth and, if so, to update the external head pointer with each new command completion and, if not, to maintain the external head pointer at a constant value with each new command completion until the current queue depth of the submission queue 1407 is the same as the effective queue depth as determined by the effective queue depth determination component 1418.

The processing system 1406 of FIG. 14 additionally includes a multiple timeout coordination component or controller 1424 configured (for use, for example, if the host device 1402 employs first and second timeout intervals and issues first commands subject to the first timeout internal and second commands subject to the second timeout interval or subject to no timeout interval) to throttle the host device 1402 only for the first commands but not the second commands A throttle activation/deactivation component or controller 1426 is configured, for example, to (a) advertise the throttling feature to the host device 1402 to permit the host to permit or restrict throttling; (b) determine whether to throttle the host device 1402 (assuming throttling is permitted) based on one or more of a current temperature of the data storage controller or a current power usage of the data storage controller relative to a power allocation; and (c) disable the throttling, if the data storage controller is reset by the host device due to a timeout. Still further, the determination of whether to throttle the host device 1402 can include determining a likelihood that a command issued to the data storage controller will not be completed by the data storage controller within a timeout interval specified by the host device 1402.

A temperature/power usage determination component or controller 1428 is configured to assess device temperature and/or power usage (relative to power allocation). A throttling aggressiveness component or controller 1430 is configured to enable throttling by initially throttling the host device 1402 by a first amount and, if no timeouts are triggered by the host device 1402, then throttling the host device 1402 by a second and greater amount. The throttling aggressiveness controller 1430 may also be configured to drip command completions to the host device 1402 (via the completion queue 1409) during periods of throttling so the host device 1402 can detect that the data storage controller is processing commands more slowly than without throttling (for reasons explained above).

In at least some examples, means may be provided for performing the functions illustrated in FIGS. 13 and 14 and/or other functions illustrated or described herein. For example, an apparatus (e.g. processing system 1306) may be provided for use with a data storage device (e.g. storage device 1304) where the apparatus includes: means (such as component 1308) for determining a current queue depth for a queue used by the host device to issue commands to the data storage controller, where the host device is configured to control the issuance of the commands based on queue depth; means (such as component 1310) for determining a modified queue depth for reporting to the host device that is different from the current queue depth; and means (such as component 1312) for controlling the issuance of additional commands from the host device to the data storage controller by reporting the modified queue depth to the host device rather than the current queue depth. The means for determining the modified queue depth may include means (such as component 1418) for setting the modified queue depth to an effective queue depth that is lower than the current queue depth. The means for controlling the issuance of additional commands from the host device may include means (such as component 1412) for throttling the issuance of the additional commands by reporting the effective queue depth to the host device to expose the host device to a queue depth that is lower than the current queue depth.

As explained above, queue may be a circular submission queue (such as queue 1407) and the modified queue depth may be the effective queue depth set for the circular submission queue. The effective queue depth is reported to the host device using an external head pointer within a completion entry posted to the host device within a completion queue (such as queue 1409). The means for determining the current queue depth may include means (such as component 1416) for determining the current queue depth for the submission queue based on a current value of an internal head pointer for the submission queue, a current value of an internal tail pointer for the submission queue, and a maximum queue size for the submission queue. Means (such as component 1414) may be provided for determining the external head pointer value for reporting to the host device based on the current internal head pointer value and the effective queue depth. Means (such as component 1420) may be provided for reporting the external head pointer value to the host device within a completion entry to set the submission queue depth as observed by the host device to the effective queue depth.

Means (such as component 1422) may be provided for determining whether the current queue depth of the submission queue is the same as the effective queue depth and, if so, updating the external head pointer with each new command completion and, if not, maintaining the external head pointer at a constant value with each new command completion until the current queue depth of the submission queue is the same as the effective queue depth. Means (such as component 1418) may be provided for setting the effective queue depth to a value sufficient to reduce a risk of a timeout within the host device arising due to failure of the data storage controller to complete an issued command within an allotted time limit. The effective queue depth may be set by the means for setting the effective queue depth based on one or more of: (1) a maximum size of the queue; (2) a performance level that can be sustained by the data storage controller in a current operating mode; (3) a number of other queues; (4) a current usage level of the queue by the host device; (5) a maximum data transfer size of each command; (6) a current average data transfer size of each command; and (7) a timeout period used by the host.

As explained above, there may be a plurality of queues (i.e. two or more queues), and, if so, the current queue depth and the modified queue depth may be determined (by their respective means components, noted above) separately for each of the plurality of queues.

Means (such as component 1426) may be provided for determining whether to throttle the host device. The means for determining whether to throttle the host device may make the determination based on one or more of a current temperature of the data storage controller or a current power usage of the data storage controller relative to a power allocation. The means for determining whether to throttle the host device may include means (such as component 1424) determining a likelihood that a command issued to the data storage controller will not be completed by the data storage controller within a timeout interval. If the host device employs first (relatively short) and second (relatively long) timeout intervals and issues first commands subject to the first timeout internal and second commands subject to the second timeout interval or no timeout interval, the means for throttling may be configured to only throttle the host device for the first (relatively short) commands but not the second (relatively long) commands or for commands with no timeout interval.

Means (such as component 1426) may be provided for advertising the throttling feature to the host device to permit the host to permit or restrict throttling. Means (such as component 1430) may be provided for dripping the command completions to the host device during periods of throttling so the host device can detect that the data storage controller is processing commands more slowly than without throttling. Means (such as component 1430) may be provided for enabling throttling by initially throttling the host device by a first amount and, if no timeouts are triggered by the host device, then throttling the host device by a second and greater amount. Means (such as component 1426) may be provided for resetting by the host device due to a timeout, throttling is disabled in the data storage controller.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIGS. 13 and 14 and/or other functions illustrated or described herein. For example, instructions may be provided for: determining a current queue depth for a queue used by the host device to issue commands to the data storage controller, where the host device is configured to control the issuance of the commands based on queue depth; determining a modified queue depth for reporting to the host device that is different from the current queue depth; and controlling the issuance of additional commands from the host device to the data storage controller by reporting the modified queue depth to the host device rather than the current queue depth. The instructions for determining the modified queue depth may include instructions for setting the modified queue depth to an effective queue depth that is lower than the current queue depth. The instructions for controlling the issuance of additional commands from the host device may include instructions for throttling the issuance of the additional commands by reporting the effective queue depth to the host device to expose the host device to a queue depth that is lower than the current queue depth.

The instructions for determining the current queue depth may include instructions for determining the current queue depth for the submission queue based on a current value of an internal head pointer for the submission queue, a current value of an internal tail pointer for the submission queue, and a maximum queue size for the submission queue. instructions may be provided for determining the external head pointer value for reporting to the host device based on the current internal head pointer value and the effective queue depth. Instructions may be provided for reporting the external head pointer value to the host device within a completion entry to set the submission queue depth as observed by the host device to the effective queue depth.

Instructions may be provided for determining whether the current queue depth of the submission queue is the same as the effective queue depth and, if so, updating the external head pointer with each new command completion and, if not, maintaining the external head pointer at a constant value with each new command completion until the current queue depth of the submission queue is the same as the effective queue depth. Instructions may be provided for setting the effective queue depth to a value sufficient to reduce a risk of a timeout within the host device arising due to failure of the data storage controller to complete an issued command within an allotted time limit. The effective queue depth may be set by the instructions for setting the effective queue depth based on one or more of the parameters discussed above.

Instructions may be provided for determining whether to throttle the host device. The instructions for determining whether to throttle the host device may make the determination based on one or more of a current temperature of the data storage controller or a current power usage of the data storage controller relative to a power allocation. The instructions for determining whether to throttle the host device may include instructions for determining a likelihood that a command issued to the data storage controller will not be completed by the data storage controller within a timeout interval. If the host device employs first (relatively short) and second (relatively long) timeout intervals and issues first commands subject to the first timeout internal and second commands subject to the second timeout interval (or to no timeout interval), the instructions for throttling may be configured to only throttle the host device for the first commands but not the second commands.

Instructions may be provided for advertising the throttling feature to the host device to permit the host to permit or restrict throttling. Instructions may be provided for dripping the command completions to the host device during periods of throttling so the host device can detect that the data storage controller is processing commands more slowly than without throttling. Instructions may be provided for enabling throttling by initially throttling the host device by a first amount and, if no timeouts are triggered by the host device, then throttling the host device by a second and greater amount. Instructions may be provided for resetting by the host device due to a timeout, throttling is disabled in the data storage controller. These are just some examples of suitable instructions for performing or controlling the various functions or operations described herein.

Figure 15:
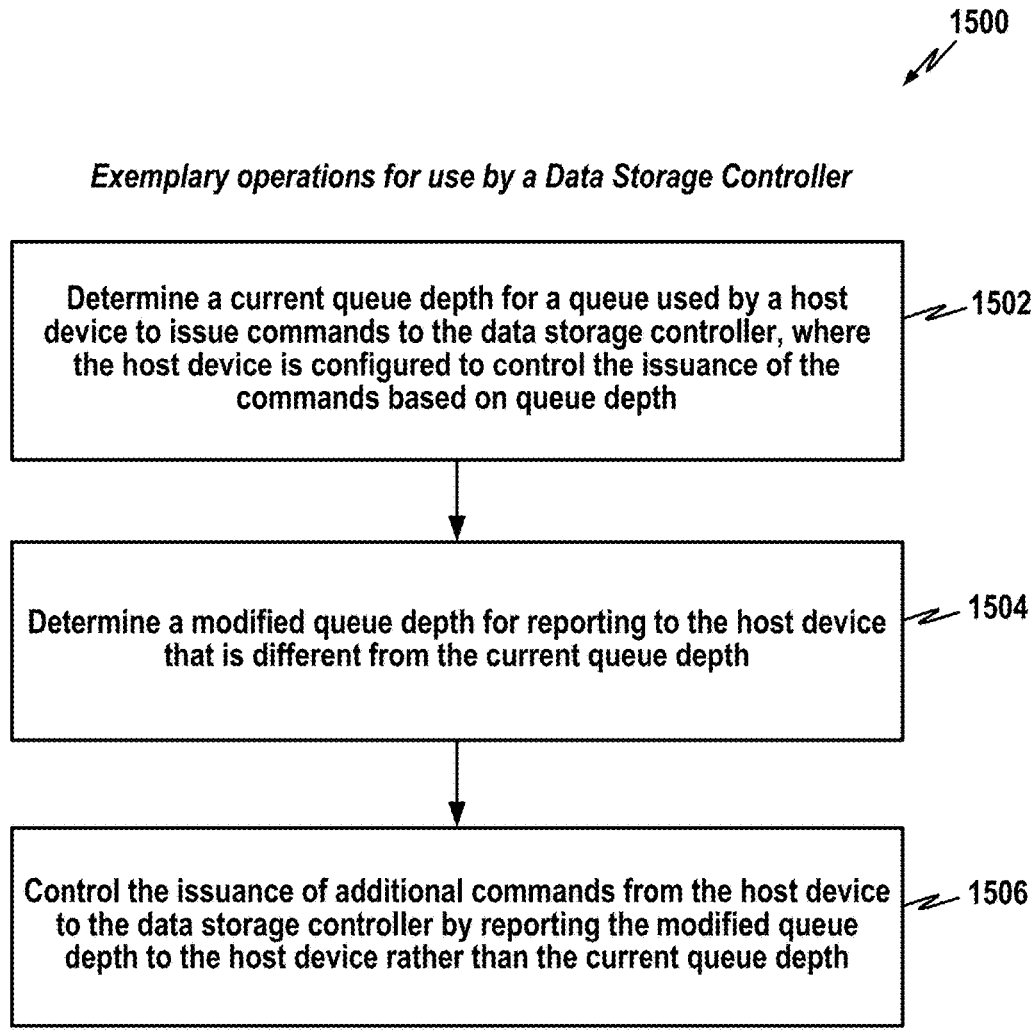
FIG. 15 is a flow chart summarizing selected operations of a data storage controller or other suitable device equipped to throttle the insertion of memory access commands by a host device into one or more queues.

FIG. 15 broadly summarizes exemplary operations 1500 for use by or with a data storage controller or other suitable device to process completion values. Briefly, at 1502, the data storage controller determines a current queue depth for a queue used by a host device to issue commands to the data storage controller, where the host device is configured to control the issuance of the commands based on queue depth. At 1504, the data storage controller determines a modified queue depth for reporting to the host device that is different from the current queue depth. At 1506, the data storage controller controls the issuance of additional commands from the host device to the data storage controller by reporting the modified queue depth to the host device rather than the current queue depth. As already discussed, the modified queue depth may be reported to the host device by using an external head pointer that is different from an internal head pointer, and offset from an internal tail pointer by an amount sufficient to provide an effective queue depth.

Figure 16:
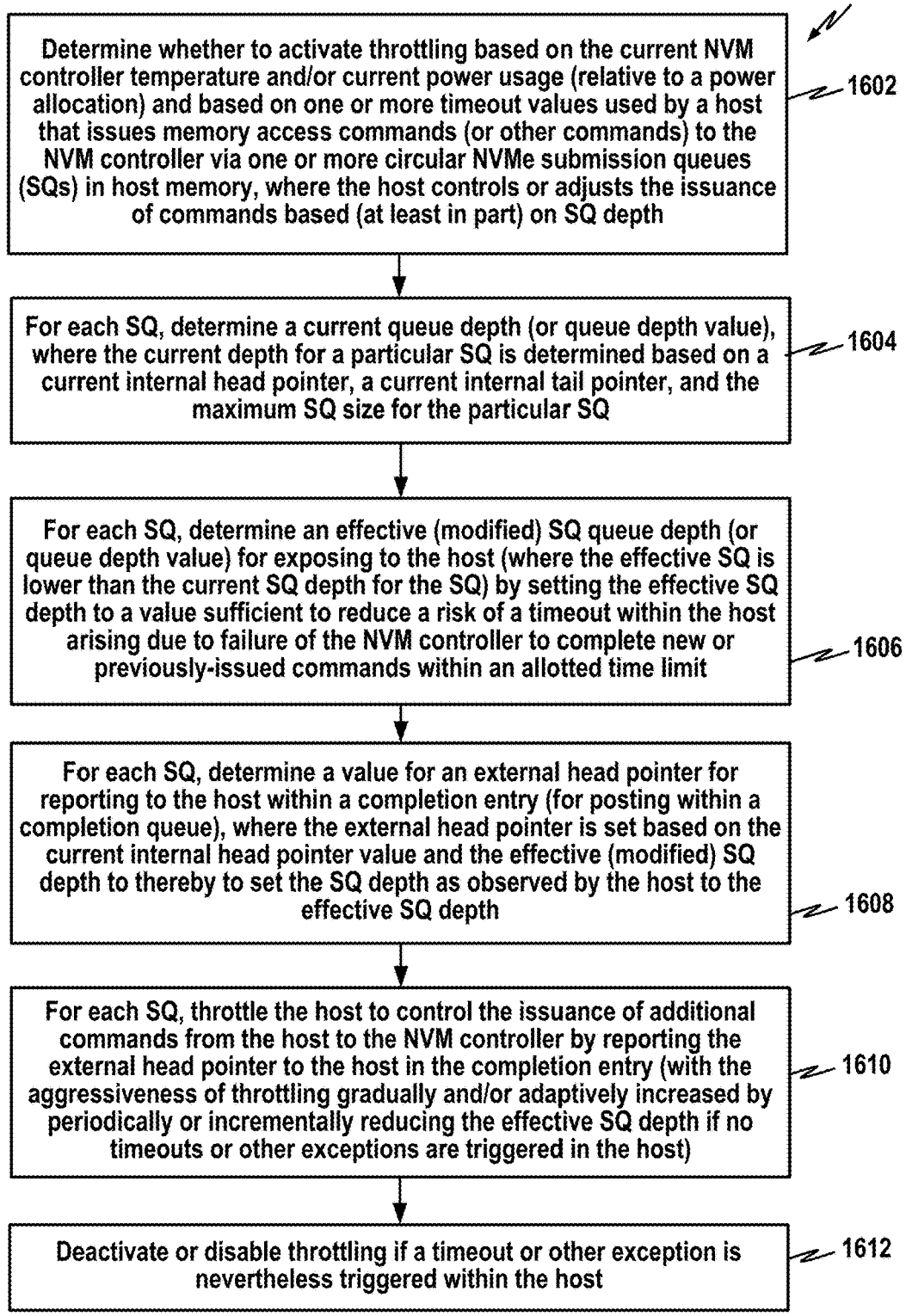
FIG. 16 is a flow chart summarizing further selected operations of a data storage controller or other suitable device equipped to throttle the insertion of memory access commands by a host device into one or more queues.

FIG. 16 further summarizes exemplary operations 1600 for use by or with a data storage controller or other suitable device to process completion values. At 1602, the data storage controller determines whether to activate throttling based on the current NVM controller temperature and/or current power usage (relative to a power allocation) and based on one or more timeout values used by a host that issues memory access commands (or other commands) to the NVM controller via one or more circular NVMe submission queues (SQs) in host memory, where the host controls or adjusts the issuance of commands based (at least in part) on SQ depth. At 1604, for each SQ, the data storage controller determines a current queue depth (or queue depth value), where the current depth for a particular SQ is determined based on a current internal head pointer, a current internal tail pointer, and the maximum SQ size for the particular SQ. At 1606, for each SQ, the data storage controller determines an effective (modified) SQ queue depth (or queue depth value) for exposing to the host (where the effective SQ is lower than the current SQ depth for the SQ) by setting the effective SQ depth to a value sufficient to reduce a risk of a timeout within the host arising due to failure of the NVM controller to complete new or previously-issued commands within an allotted time limit.

At 1608, for each SQ, the data storage controller determines a value for an external head pointer for reporting to the host within a completion entry (for posting within a completion queue), where the external head pointer is set based on the current internal head pointer value and the effective (modified) SQ depth to thereby to set the SQ depth as observed by the host to the effective SQ depth. At 1610, for each SQ, the data storage controller throttles the host to control the issuance of additional commands from the host to the NVM controller by reporting the external head pointer to the host in the completion entry (with the aggressiveness of throttling gradually and/or adaptively increased by periodically or incrementally reducing the effective SQ depth if no timeouts or other exceptions are triggered in the host). At 1612, the data storage controller may deactivate or disable throttling if a timeout or other exception is nevertheless triggered within the host.

The subject matter described herein can be implemented in any suitable NAND flash memory, including 2D or 3D NAND flash memory. Semiconductor memory devices include volatile memory devices, such as DRAM) or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage controller for controlling a data storage device based on commands issued by a host device, comprising:
   determining a current queue depth for a queue used by the host device to issue commands to the data storage controller, where the host device is configured to control the issuance of the commands based on queue depth;
   determining a modified queue depth for reporting to the host device that is different from the current queue depth; and
   controlling the issuance of additional commands from the host device to the data storage controller by reporting the modified queue depth to the host device rather than the current queue depth.

2. The method of claim 1,
   wherein determining the modified queue depth includes setting the modified queue depth to an effective queue depth that is lower than the current queue depth, and
   wherein controlling the issuance of the additional commands includes throttling the issuance of the additional commands by reporting the effective queue depth to the host device to expose the host device to a queue depth that is lower than the current queue depth.

3. The method of claim 2,
   wherein the queue is a submission queue with an internal head pointer, and
   wherein the effective queue depth is reported to the host device using an external head pointer that is different from the internal head pointer of the submission queue.

4. The method of claim 3, wherein determining the current queue depth includes determining the current queue depth of the submission queue based on a current value of the internal head pointer of the submission queue, a current value of an internal tail pointer of the submission queue, and a maximum queue size for the submission queue.

5. The method of claim 3, further including determining the external head pointer based on a current internal head pointer and the effective queue depth.

6. The method of claim 3, further including reporting the external head pointer to the host device within a completion entry to set a submission queue depth as observed by the host device to the effective queue depth.

7. The method of claim 3, further including determining whether the current queue depth of the submission queue is the same as the effective queue depth and, if so, updating the external head pointer with each new command completion and, if not, maintaining the external head pointer at a constant value with each new command completion until the current queue depth of the submission queue is the same as the effective queue depth.

8. The method of claim 3, further including setting the effective queue depth to a value sufficient to reduce a risk of a timeout within the host device arising due to failure of the data storage controller to complete an issued command within an allotted time limit.

9. The method of claim 8, wherein the effective queue depth is set based on one or more of: (1) a maximum size of the submission queue; (2) a performance level that can be sustained by the data storage controller in a current operating mode; (3) a total number of submission queues; (4) a current usage level of the submission queue by the host device; (5) a maximum data transfer size of the issued command; (6) a current average data transfer size of the issued command; and (7) a timeout period used by the host device.

10. The method of claim 1, wherein there are two or more queues, and wherein the current queue depth and the modified queue depth are determined separately for each queue.

11. The method of claim 1, further including determining whether to throttle the host device, and wherein determining the modified queue depth and controlling the issuance of the additional commands are only performed if the host device is to be throttled.

12. The method of claim 11, wherein determining whether to throttle the host device is based on one or more of a current temperature of the data storage controller or a current power usage of the data storage controller relative to a power allocation.

13. The method of claim 11, wherein determining whether to throttle the host device includes determining a likelihood that a command issued to the data storage controller by the host device will not be completed by the data storage controller within a timeout interval.

14. The method of claim 11, wherein the host device employs first and second timeout intervals and issues first commands subject to the first timeout interval and issues second commands subject to the second timeout interval or subject to no timeout interval, and wherein the host device is throttled only for the first commands but not the second commands.

15. The method of claim 11, wherein the data storage controller advertises a throttling feature to the host device to permit the host device to permit or restrict throttling.

16. The method of claim 11, wherein the data storage controller drips command completions to the host device during periods of throttling so the host device can detect that the data storage controller is processing commands more slowly than without throttling.

17. The method of claim 11, wherein the data storage controller enables throttling by throttling the host device by a first amount and, if no timeouts are triggered by the host device, then throttling the host device by a second and greater amount.

18. The method of claim 11, wherein, if the data storage controller is reset by the host device due to a timeout, throttling is disabled in the data storage controller.

19. The method of claim 1, wherein the data storage device is a non-volatile memory (NVM) device, and wherein the data storage controller accesses the NVM device based on the commands issued to the data storage controller by the host device.

20. A data storage controller for use with a data storage device, comprising:
a processing system configured to
determine a current queue depth for a queue used by a host device to issue commands to the data storage controller, where the host device is configured to control the issuance of the commands based on queue depth,
determine a modified queue depth for reporting to the host device that is different from the current queue depth, and
control the issuance of additional commands from the host device to the data storage controller by reporting the modified queue depth to the host device rather than the current queue depth.

21. The data storage controller of claim 20,
wherein the processing system is configured to determine the modified queue depth by setting the modified queue depth to an effective queue depth that is lower than the current queue depth, and
wherein the processing system is configured to control the issuance of additional commands by throttling the issuance of the additional commands by reporting the effective queue depth to the host device to expose the host device to a queue depth that is lower than the current queue depth.

22. The data storage controller of claim 21,
wherein the queue is a submission queue with an internal head pointer, and
wherein the processing system is configured to report the effective queue depth to the host device using an external head pointer that is different from the internal head pointer of the submission queue.

23. The data storage controller of claim 22, wherein the processing system is configured to determine the current queue depth of the submission queue based on a current value of the internal head pointer of the submission queue, a current value of an internal tail pointer of the submission queue, and a maximum queue size for the submission queue.

24. The data storage controller of claim 22, wherein the processing system is configured to determine the external head pointer based on a current internal head pointer and the effective queue depth.

25. The data storage controller of claim 22, wherein the processing system is configured to report the external head pointer to the host device within a completion entry to set a submission queue depth as observed by the host device to the effective queue depth.

26. The data storage controller of claim 22, wherein the processing system is further configured to determine whether the current queue depth of the submission queue is the same as the effective queue depth and, if so, to update the external head pointer with each new command completion and, if not, to maintain the external head pointer at a constant value with each new command completion until the current queue depth of the submission queue is the same as the effective queue depth.

27. The data storage controller of claim 22, wherein the processing system is further configured to set the effective queue depth to a value sufficient to reduce a risk of a timeout within the host device arising due to failure of the data storage controller to complete an issued command within an allotted time limit.

28. The data storage controller of claim 27, wherein the processing system is configured to set the effective queue depth based on one or more of: (1) a maximum size of the submission queue; (2) a performance level that can be sustained by the data storage controller in a current operating mode; (3) a total number of submission queues; (4) a current usage level of the submission queue by the host device; (5) a maximum data transfer size of the issued command; (6) a current average data transfer size of the issued command; and (7) a timeout period used by the host device.

29. The data storage controller of claim 20, wherein the data storage device is a non-volatile memory (NVM) device, and wherein the processing system is further configured to access the NVM device based on the commands issued by the host device.

30. An apparatus for use with a data storage controller, comprising:
 means for determining a current queue depth for a queue used by a host device to issue commands to the data storage controller, where the host device is configured to control the issuance of the commands based on queue depth;
 means for determining a modified queue depth for reporting to the host device that is different from the current queue depth; and
 means for controlling the issuance of additional commands from the host device to the data storage controller by reporting the modified queue depth to the host device rather than the current queue depth.

* * * * *